United States Patent
Hanabusa et al.

(10) Patent No.: US 6,824,239 B1
(45) Date of Patent: Nov. 30, 2004

(54) PRINTER WITH FAST LINE-FEED SPEED

(75) Inventors: Tadashi Hanabusa, Kawasaki (JP);
Akitoshi Yamada, Yokohama (JP);
Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 09/661,034

(22) Filed: Sep. 13, 2000

(51) Int. Cl.$^7$ .......................... B41J 2/205; B41J 2/135; B41J 2/21

(52) U.S. Cl. .......................... 347/15; 347/40; 347/41; 347/43

(58) Field of Search .......................... 347/15, 40, 41, 347/43

(56) References Cited

U.S. PATENT DOCUMENTS

| | | | |
|---|---|---|---|
| 4,510,506 A | 4/1985 | Moriguchi et al. | ......... 347/182 |
| 5,926,192 A | 7/1999 | Yamane | ............ 347/10 |
| 2002/0109746 A1 * | 8/2002 | Murakami et al. | ............ 347/29 |

FOREIGN PATENT DOCUMENTS

| | | | | |
|---|---|---|---|---|
| EP | 0 679 518 | 11/1995 | ............ | B41J/2/205 |
| EP | 0 760 289 | 3/1997 | ............ | B41J/2/205 |
| EP | 0 935 213 | 8/1999 | .......... | G06K/15/10 |
| EP | 0 967 791 | 12/1999 | ............ | H04N/1/60 |
| EP | 0 940 975 | 12/2001 | ............ | G09G/3/20 |

* cited by examiner

Primary Examiner—Stephen D. Meier
Assistant Examiner—Alfred Duddintg
(74) Attorney, Agent, or Firm—Fitzpatrick, Cella, Harper & Scinto

(57) ABSTRACT

A printer that prints an image having a resolution higher than a resolution of nozzles on a print head on a recording medium by scanning the print head across a region of the recording medium a plural-number of times, said print head having nozzles spaced at a nozzle pitch which is a reciprocal number of the resolution of the nozzles and adapted to eject ink from the nozzles on the basis of print data. The printer has a line feeding motor that is actuated in a unit of a pulse, and a line feeding device, driven by the line feeding motor actuated in the unit of the pulse, for feeding the recording medium in a unit of a predetermined feeding length fed by an actuating pulse, the predetermined feeding length being (m/k×nozzle pitch), where k is the resolution of the printed image/the resolution of the nozzles, m and k are integers, and m is greater than k but indivisible by k. A controller controls the line feeding motor to actuate in the unit of the pulse and control a number of the nozzles utilized for printing the image when printing an image on the recording medium by scanning the print head across the recording medium a plural-number of times.

15 Claims, 15 Drawing Sheets

PRINTER WITH FAST LINE-FEED SPEED

BACKGROUND OF THE INVENTION

1. Field of the Invention

The present invention relates to feeding of a recording medium in printers. More specifically, the present invention relates to control of line feeding of a recording medium in conjunction with print head nozzle firing so as to advance the recording medium for high resolution printing with a lower amount of line feeding motor steps.

2. Description of the Related Art

Line feeding in printers refers to the advancement of a recording medium through the printer during printing operations. During printing operations, the recording medium is fed through the printer by line feed rollers that are driven by a line feed motor controlled by a controller. The line feed motor and the line feed rollers are connected by a drivetrain so that as the line feed motor rotates, the line feed rollers also rotate. The recording medium is fed between the line feed rollers and pinch rollers and as the line feed rollers rotate, the recording medium is fed through the printer.

One type of line feed motor is known as a stepper motor. A stepper motor rotates in steps, i.e. stepped increments or pulses. Each increment or pulse corresponds to a predetermined amount (or phase) of rotation. Some of the most common stepper motors used in printers have stepped increments of 1.8° (corresponding to a 200 pulse motor where 200 pulses×1.8°=360°), 3.6° (corresponding to a 100 pulse motor), and 3.75° (corresponding to a 96 pulse motor). For each increment (pulse) that the line feed motor rotates, the line feed rollers also rotate and feed the recording medium a horizontal amount corresponding to the amount of rotation of the line feed rollers. The amount of rotation of the line feed rollers is determined by the drivetrain ratio employed between the line feed motor and the line feed rollers.

Conventionally, the drivetrain ratio has been set so that one pulse of the line feed motor advances the recording medium an amount equivalent to the maximum resolution of the printer. For example, where the maximum resolution of a printout of the printer is 600 dpi (dots per inch), the drivetrain ratio has been set so that one pulse of the line feed motor corresponds to a 600 dpi pitch line feed of the recording medium. Thus, the line feed ratio to obtain a 600 dpi resolution printout would be 1/600 (1 pulse equals 600 dpi advancement of the recording medium).

In order to obtain higher resolution printouts, such as a 1200 dpi printout, additional motor pulses are required. Consider, for example, a print head having 100 nozzles spaced at a 600 dpi pitch printing a 1200 dpi image. The print head performs two scans across the same scan area to perform 1200 dpi printing (a first scan printing at 600 dpi and a second scan also printing at 600 dpi after a 1200 dpi paper advancement). After the second scan, the paper is advanced to the end of the 100 nozzle printout. In order to advance the paper to the end of the 100 nozzle print, 200 pulses of the motor would be required (it takes 2 pulses to advance the paper one 600 dpi pixel, therefore it takes 200 pulses to advance the paper 100 pixels). The 200 pulses result in a slower line feed speed than would otherwise be required if less motor pulses were needed to advance the paper the same 100 pixel amount. Thus, what is needed is a way to increase the line feed speed at higher resolutions.

It has been proposed that, to increase the line feed speed, that the motor speed itself could be increased. However, higher resolution printouts also require a higher degree of accuracy of the motor. Faster and more accurate motors are expensive and increase the cost of the printer. Therefore, what is needed is a way to increase the line feed speed at higher resolutions and to maintain accuracy without a significant increase in the motor cost.

SUMMARY OF THE INVENTION

The present invention addresses the foregoing by feeding the recording medium a fractional amount greater than the maximum resolution of the printer for each increment (phase) of the line feed motor and controlling a number of nozzles that eject ink based on the number of increments. In one representative embodiment, each increment of the line feed motor results in a 1.5 pixel advancement of the recording medium in a pixel resolution of a print head. A comparison of this embodiment to the above described example in which a 1/600 feeding ratio results, the present invention results in a 1/400 feeding ratio for the same motor. Therefore, less line feed motor increments are required to advance the recording medium an equivalent amount. Since less motor increments are required, the line feed speed is increased. Moreover, controlling the nozzle firing provides for adjustment of the nozzle firing for the fractional increments, thereby providing for printing a continuous image.

Thus, in one aspect the invention is printing images on a recording medium fed through a printer by actuating a line feeding motor in predetermined stepped increments, feeding the recording medium through the printer by a line feeding device driven by the line feeding motor, printing an image on the recording medium by a print head scanning across the recording medium and ejecting ink from nozzles, the print head having j nozzles spaced at a predetermined pixel resolution that is less than a pixel resolution printed by the printer, j being an integer number, controlling the line feed motor to actuate in stepped increments, and controlling a number of the j nozzles utilized in printing the image. For each stepped increment of the line feed motor, the line feeding device feeds the recording medium (m×1/n) pixels of the print head pixel resolution, where m and n are integer numbers and m is greater than n. The j nozzles that print in any one scan of the print head are controlled based on the number of increments of the line feed motor.

In a related aspect, the invention is feeding a recording medium through a printer for printing images on the recording medium by actuating a line feeding motor in stepped increments, feeding the recording medium through the printer by a line feeding device driven by the line feeding motor, and performing banded printing of an image on the recording medium by a print head scanning across the recording medium, the print head having nozzles spaced at a first resolution. One increment of the line feeding motor results in a feed amount of m/n times the print head nozzle spacing, where m/n is greater than 1, and m and n are integer values where m is greater than n, and, to print the image, the line feeding motor is actuated n increments, or an integer multiple of n increments between bands.

In other aspects, m may be equal to 3 and n equal to 2. The number of increments of the line feed motor may equal 2 so that every 2 increments equals a line feed of 3 pixels in the pixel resolution printed by the printer. The number of nozzles, j, may equal 304 or 80, and 300 or less, or 78 or less nozzles may be utilized to print in any one scan of the print head. The j nozzles may be spaced at a 600 dpi resolution and the printed resolution of the printer may be 1200 dpi.

In another aspect, the invention processes image data to be sent to a printer by performing rasterization, color conversion and halftone processing on the image data, storing the processed image data in a print buffer for transmission to the printer, calculating a line skip amount, calculating a buffer offset amount, and adjusting a starting position for storing of the image data in the print buffer based on a result of the calculated buffer offset amount. The line skip amount and the buffer offset amount are calculated in a case where a first line of image data to be stored in the print buffer is white data. Additionally, the printer has a line feed ratio of m×1/n in a pixel resolution of a print head, where m and n are integer numbers greater than 1, m is greater than n, and the line skip amount and the buffer offset amount are calculated based on the line feed ratio.

In a related aspect, the invention processes image data to be sent to a printer that prints image data on a recording medium at a print pixel resolution greater than a resolution of a print head and feeds the recording medium in units of a feed amount corresponding to (m×1/n) pixels of the print head resolution, where m and n are integer numbers and m is greater than n, the image process comprising generating a line of image data, determining whether at least a number of contiguous lines of image data do not include a pixel to be printed, the number of contiguous lines corresponding to the feed amount unit, and sending line skip amount information to the printer based on a result of the determining step. The determining, step comprises storing the line of image data in a print buffer for transmission to the printer, and calculating the line skip amount. The determining step may further comprise calculating a buffer offset amount, and adjusting a starting position for storing the image data in the print buffer based on a result of the calculated buffer offset amount. The skip amount and the buffer offset amount are calculated in a case where a first line of image data to be stored in the print buffer is white data.

As a result of the foregoing, the invention controls a line feed amount and loading of image data in a print buffer to adjust for white image data encountered as at least the first line of the image data being loaded in the buffer. Therefore, the line feed ratio and line feed amount for advancing the recording medium to adjust for the white space is accommodated to provide for a faster line feed speed while at the same time controlling the data loading.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
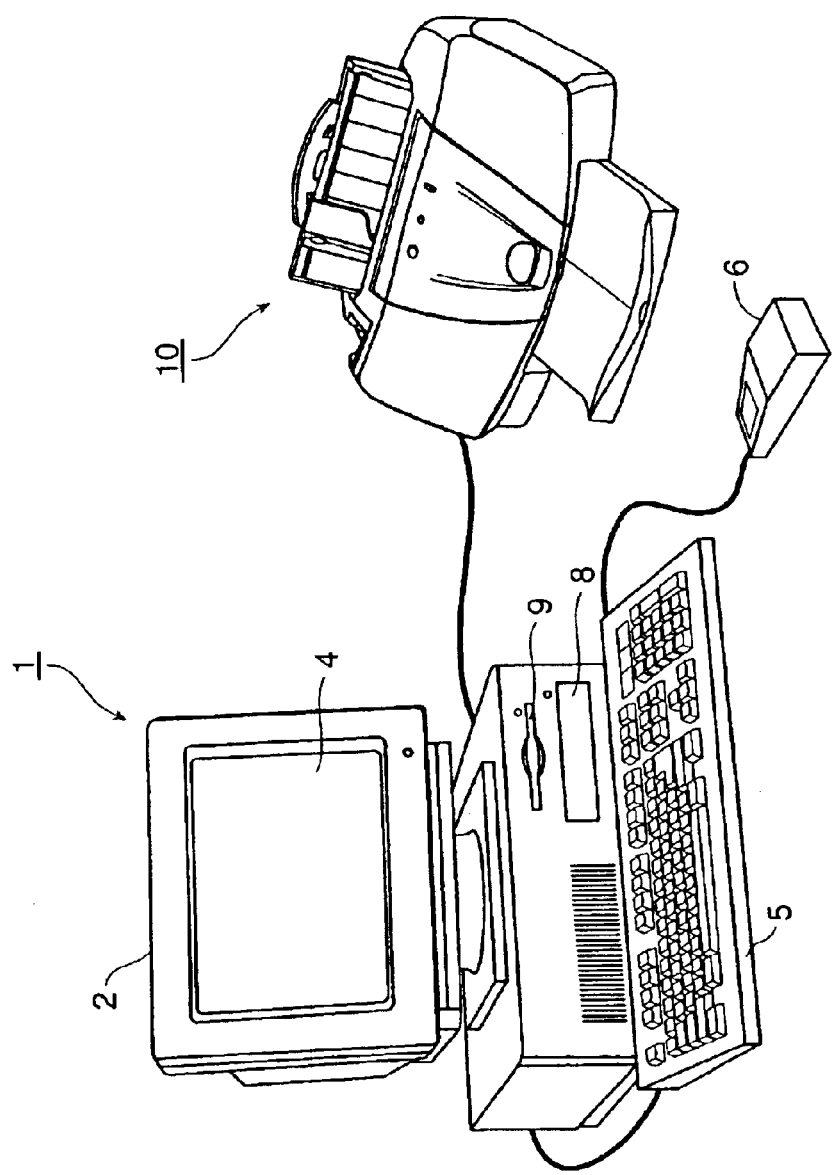
FIG. 1 shows a perspective view of computing equipment used in connection with the printer of the present invention.

FIG. 1 is a view showing the outward appearance of computing equipment used in connection with the invention described herein. Computing equipment 1 includes host processor 2. Host processor 2 comprises a personal computer (hereinafter "PC"), preferably an IBM PC-compatible computer having a windowing environment, such as Microsoft® Windows95. Provided with computing equipment 1 are display 4 comprising a color monitor or the like, keyboard 5 for entering text data and user commands, and pointing device 6. Pointing device 6 preferably comprises a mouse for pointing and for manipulating objects displayed on display 4.

Computing equipment 1 includes a computer-readable memory medium, such as fixed computer disk 8, and floppy disk interface 9. Floppy disk interface 9 provides a means whereby computing equipment 1 can access information, such as data, application programs, etc., stored on floppy disks. A similar CD-ROM interface (not shown) may be provided with computing equipment 1, through which computing equipment 1 can access information stored on CD-ROMs.

Disk 8 stores, among other things, application programs by which host processor 2 generates files, manipulates and stores those files on disk 8, presents data in those files to an operator via display 4, and prints data in those files via printer 10. Disk 8 also stores an operating system which, as noted above, is preferably a windowing operating system such as Windows95. Device drivers are also stored in disk 8. At least one of the device drivers comprises a printer driver which provides a software interface to firmware in printer 10. Data exchange between host processor 2 and printer 10 is described in more detail below.

Figure 2:
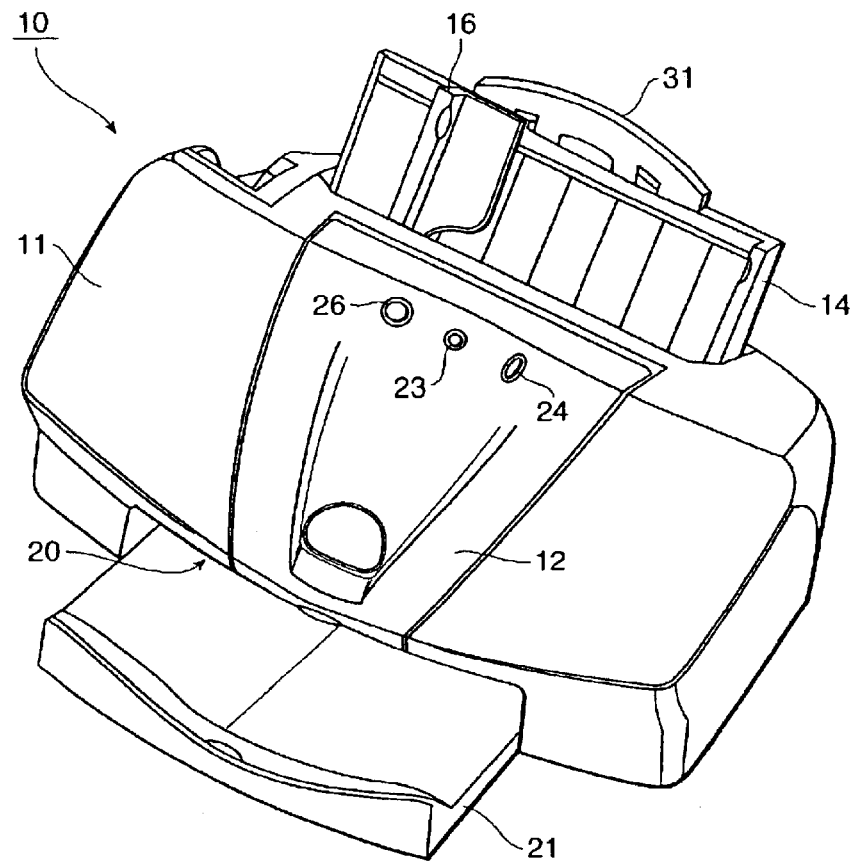
FIG. 2 is a front perspective view of the printer shown in FIG. 1.
Figure 3:
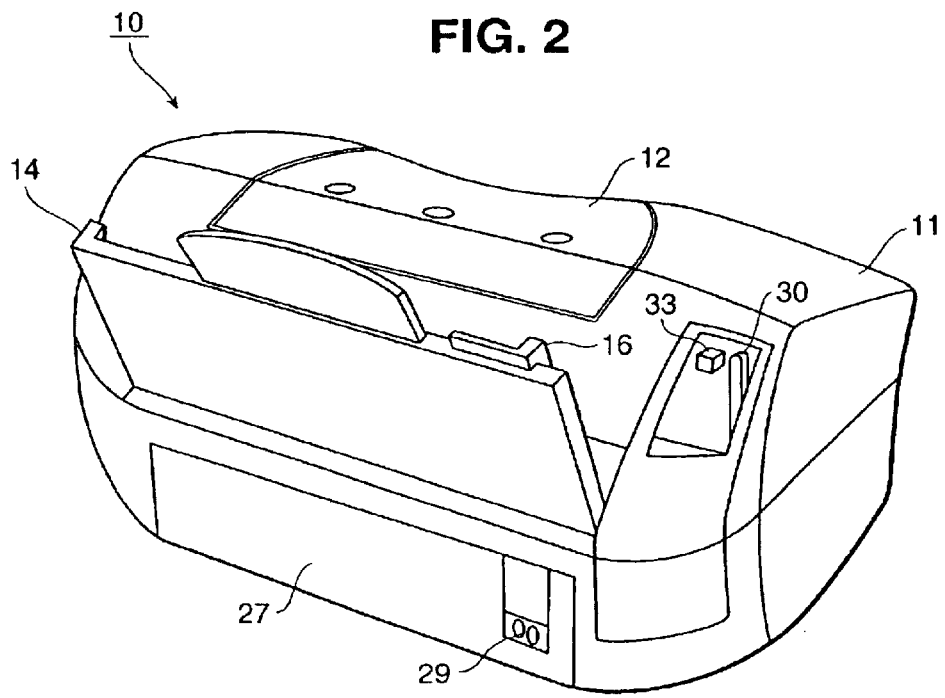
FIG. 3 is a back perspective view of the printer shown in FIG. 1.

FIGS. 2 and 3 show perspective front and back views, respectively, of printer 10. As shown in FIGS. 2 and 3, printer 10 includes housing 11, access door 12, automatic feeder 14, automatic feed adjuster 16, media eject port 20, ejection tray 21, power source 27, power cord connector 29, parallel port connector 30 and universal serial bus (USB) connector 33.

Housing 11 houses the internal workings of printer 10, including a print engine which controls the printing operations to print images onto recording media. Included on housing 11 is access door 12. Access door 12 is manually openable and closeable so as to permit a user to access the internal workings of printer 10 and, in particular, to access ink tanks installed in printer 10 so as to allow the user to change or replace the ink tanks as needed. Access door 12 also includes indicator light 23, power on/off button 26 and resume button 24. Indicator light 23 may be an LED that lights up to provide an indication of the status of the printer, i.e. powered on, a print operation in process (blinking), or a failure indication. Power on/off button 26 may be utilized to turn the printer on and off and resume button 24 may be utilized to reset an operation of the printer.

As shown in FIGS. 2 and 3, automatic feeder 14 is also included on housing 11 of printer 10. Automatic feeder 14 defines a media feed portion of printer 10. That is, automatic feeder 14 stores recording media onto which printer 10 prints images. In this regard, printer 10 is able to print images on a variety of types of recording media. These types include, but are not limited to, plain paper, high resolution paper, transparencies, glossy paper, glossy film, back print film, fabric sheets, T-shirt transfers, bubble jet paper, greeting cards, brochure paper, banner paper, thick paper, etc.

During printing, individual sheets which are stacked within automatic feeder 14 are fed from automatic feeder 14 through printer 10. Automatic feeder 14 includes automatic feed adjuster 16. Automatic feed adjuster 16 is laterally movable to accommodate different media sizes within automatic feeder 14. These sizes include, but are not limited to, letter, legal, A4, B5 and envelope. Custom-sized recording media can also be used with printer 10. Automatic feeder 14 also includes backing 31, which is extendible to support recording media held in automatic feeder 14. When not in use, backing 31 is stored within a slot in automatic feeder 14, as shown in FIG. 2.

As noted above, media are fed through printer 10 and ejected from eject port 20 into ejection tray 21. Ejection tray 21 extends outwardly from housing 11 as shown in FIG. 2 and, provides a receptacle for the recording media upon ejection for printer 10. When not in use, ejection tray 21 may be stored within printer 10.

Power cord connector 29 is utilized to connect printer 10 to an external AC power source. Power supply 27 is used to convert AC power from the external power source, and to supply the converted power to printer 10. Parallel port 30 connects printer 10 to host processor 2. Parallel port 30 preferably comprises an IEEE-1284 bi-directional port, over which data and commands are transmitted, between printer 10 and host processor 2. Alternatively, data and commands can be transmitted to printer 10 through USB port 33.

Figure 4:
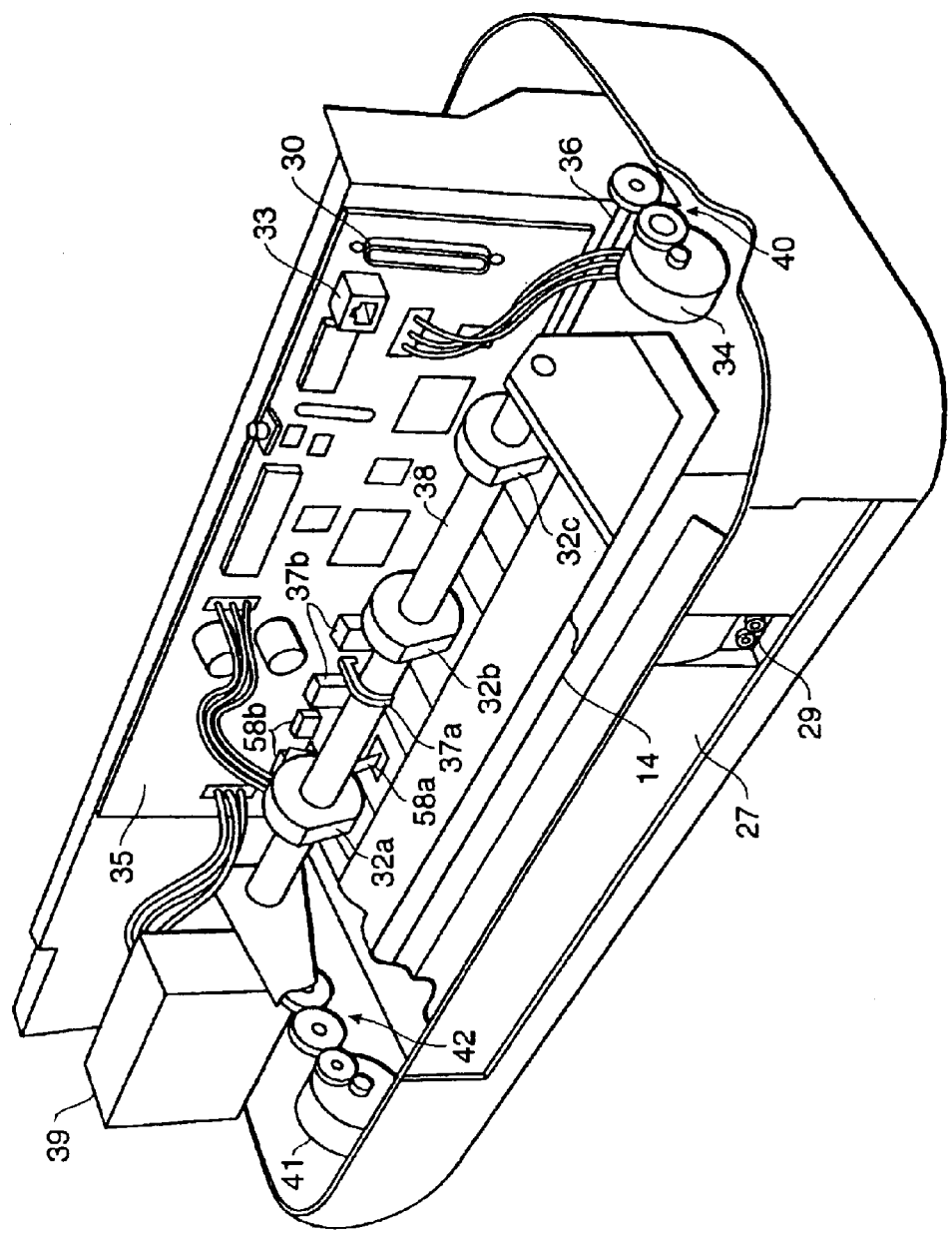
FIG. 4 is a back, cut-away perspective view of the printer shown in FIG. 1.
Figure 5:
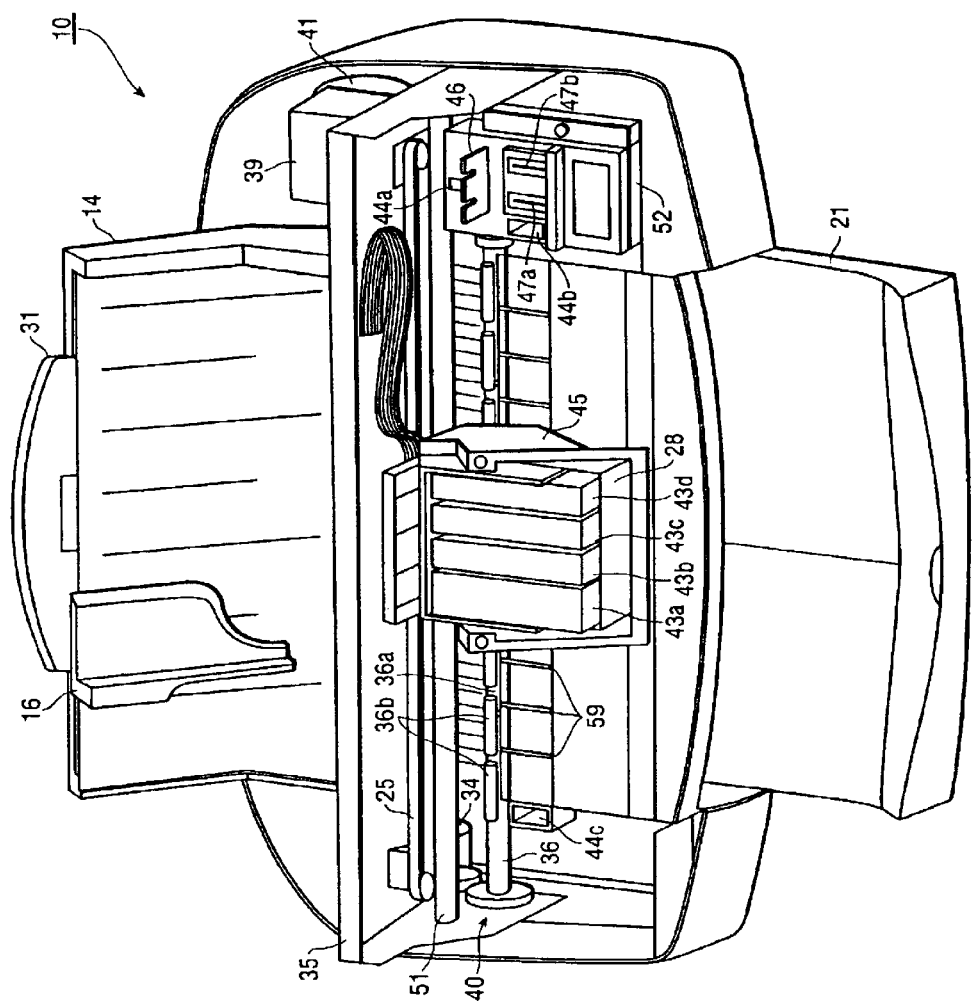
FIG. 5 is a front, cut-away perspective view of the printer shown in FIG. 1.

FIGS. 4 and 5 show back and front cut-away perspective views, respectively, of printer 10. As shown in FIG. 4, printer 10 includes an automatic sheet feed assembly (ASF) that comprises automatic sheet feeder 14, ASF rollers 32a, 32b and 32c attached to ASF shaft 38 for feeding media from automatic feeder 14. ASF shaft 38 is driven by drive train assembly 42. Drive train assembly 42 is made up of a series of gears that are connected to and driven by ASF motor 41. Drive train assembly 42 is described in more detail below with reference to FIGS. 6A and 6B. ASF motor 41 is preferably a stepper motor that rotates in stepped increments (pulses). Utilization of a stepper motor provides the ability for a controller incorporated in circuit board 35 to count the number of steps the motor rotates each time the ASF is actuated. As such, the position of the ASF rollers at any instant can be determined by the controller. ASF shaft 38 also includes an ASF initialization sensor tab 37a. When the ASF shaft is positioned at a home position (initialization position), tab 37a is positioned between ASF initialization sensors 37b. Sensors 37b are light beam sensors, where one is a transmitter and the other a receiver such that when tab 37a is positioned between sensors 37b, tab 37a breaks continuity of the light beam, thereby indicating that the ASF is at the home position.

Also shown in FIG. 4 is a page edge (PE) detector lever 58a and PE sensors 58b. PE sensors 58b are similar to ASF initialization sensors 37b. That is, they are light beam sensors. PE lever 58a is pivotally mounted and is actuated by a sheet of the recording medium being fed through the printer 10. When no recording medium is being fed through printer 10, lever 58a is at a home position and breaks continuity of the light beam between sensors 58b. As a sheet of the recording medium begins to be fed through the printer by the ASF rollers, the leading edge of the recording medium engages PE lever 58a pivotally moving the lever to allow continuity of the light beam to be established between sensors 58b. Lever 58a remains in this position while the recording medium is being fed through printer 10 until the trailing edge of the recording medium reaches PE lever 58a, thereby disengaging lever 58a from the recording medium and allowing lever 58a to return to its home position to break the light beam. The PE sensor is utilized in this manner to sense when a page of the recording medium is being fed through the printer and the sensors provide feedback of such to a controller on circuit board 35.

Figure 6A:
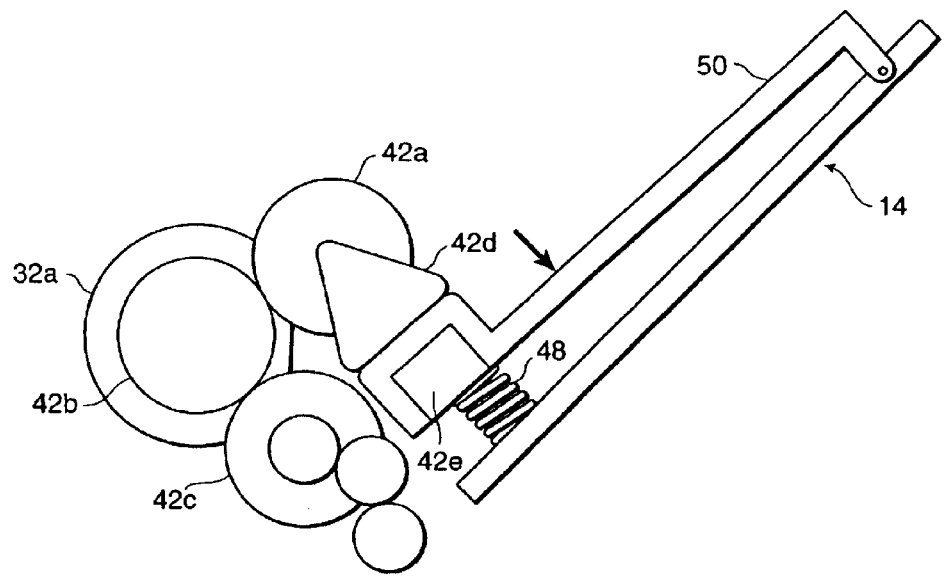
FIGS. 6A and 6B show a geartrain configuration for an automatic sheet feeder of the printer shown in FIG. 1.
Figure 6B:
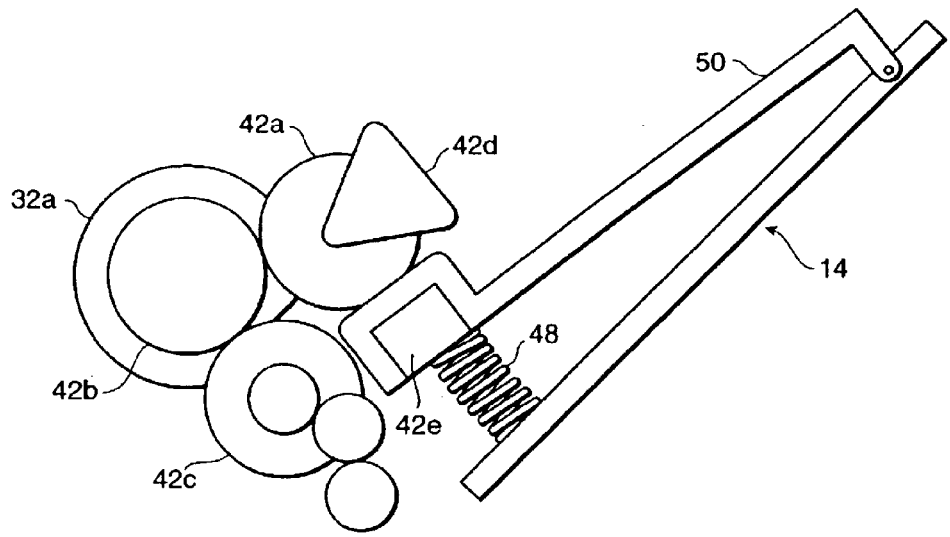

ASF gear train assembly 42 may appear as shown in FIGS. 6A and 6B. As shown in FIG. 6A, gear train assembly 42 comprises gears 42a, 42b and 42c. Gear 42b is attached to the end of ASF shaft 38 and turns the shaft when ASF motor 41 is engaged. Gear 42a engages gear 42b and includes a cam 42d that engages an ASF tray detent arm 42e of automatic feeder 14. As shown in FIG. 6A, when ASF shaft 38 is positioned at the home position, cam 42d presses against detent arm 42e. Automatic feeder 14 includes a pivotally mounted plate 50 that is biased by spring 48 so that when cam 42d engages detent arm 42e, automatic feeder 14 is depressed and when cam 42d disengages detent arm 42e (such as that shown in FIG. 6B), plate 50 is released. Depressing detent arm 42e causes the recording media stacked in automatic feeder 14 to move away from ASF rollers 32a, 32b and 32c and releasing detent arm 42e allows the recording to move close to the rollers so that the rollers can engage the recording medium when the ASF motor is engaged.

Returning to FIG. 4, printer 10 includes line feed motor 34 that is utilized for feeding the recording medium through printer 10 during printing operations. Line feed motor 34 drives line feed shaft 36, which includes line feed pinch rollers 36a, via line feed geartrain 40. The geartrain ratio for line feed geartrain 40 is set to advance the recording medium a set amount for each pulse of line feed motor 34. The ratio may be set so that one pulse of line feed motor 34 results in a line feed amount of the recording medium equal to a one pixel resolution advancement of the recording medium. That is, if one pixel resolution of the printout of printer 10 is 600 dpi (dots per inch), the geartrain ratio may be set so that one pulse of line feed motor 34 results in a 600 dpi advancement of the recording medium. Alternatively, the ratio may be set so that each pulse of the motor results in a line feed amount that is equal to a fractional portion of one pixel resolution rather than being a one-to-one ratio. Line feed motor 34 preferably comprises a 200-step, 2 phase pulse motor and is controlled in response to signal commands received from circuit board 35 of course, line feed motor 34 is not limited to a 200-step 2 phase pulse motor and any other type of line feed motor could be employed, including a DC motor with an encoder.

As shown in FIG. 5, printer 10 is a single cartridge printer which prints images using dual print heads, one having nozzles for printing black ink and the other having nozzles for printing cyan, magenta and yellow inks. Specifically, carriage 45 holds cartridge 28 that preferably accommodates ink tanks 43a, 43b, 43c and 43d, each containing a different colored ink. A more detailed description of cartridge 28 and ink tanks 43a to 43d is provided below with regard to FIG. 7. Carriage 45 is driven by carriage motor 39 in response to signal commands received from circuit board 35. Specifically, carriage motor 39 controls the motion of belt 25, which in turn provides for horizontal translation of carriage 45 along carriage guide shaft 51. In this regard, carriage motor 39 provides for bi-directional motion of belt 25, and thus of carriage 45. By virtue of this feature, printer 10 is able to perform bi-directional printing, i.e. print images from both left to right and right to left.

Printer 10 preferably includes recording medium cockling ribs 59. Ribs 59 induce a desired cockling pattern into the recording medium which the printer can compensate for by adjusting the firing frequency of the print head nozzles. Ribs 59 are spaced a set distance apart, depending upon the desired cockling shape. The distance between ribs 59 may be based on motor pulses of carriage motor 39. That is, ribs 59 may be positioned according to how many motor pulses of carriage motor 39 it takes for the print head to reach the location. For example, ribs 59 may be spaced in 132 pulse increments.

Printer 10 also preferably includes pre-fire receptacle areas 44a, 44b and 44c, wiper blade 46, and print head caps 47a and 47b. Receptacles 44a and 44b are located at a home position of carriage 45 and receptacle 44c is located outside of a printable area and opposite the home position. At desired times during printing operations, a print head pre-fire operation may be performed to eject a small amount of ink from the print heads into receptacles 44a, 44b and 44c. Wiper blade 46 is actuated to move with a forward and backward motion relative to the printer. When carriage 45 is moved to its home position, wiper blade 46 is actuated to move forward and aft so as to traverse across each of the print heads of cartridge 28, thereby wiping excess ink from the print heads. Print head caps 47a and 47b are actuated in a relative up and down motion to engage and disengage the print heads when carriage 45 is at its home position. Caps 47a and 47b are actuated by ASF motor 41 via a geartrain (not shown). Caps 47a and 47b are connected to a rotary pump 52 via tubes (not shown). Pump 52 is connected to line feed shaft 36 via a geartrain (not shown) and is actuated by running line feed motor 34 in a reverse direction. When caps 47a and 47b are actuated to engage the print heads, they form an airtight seal such that suction applied by pump 52 through the tubes and caps 47a and 47b sucks ink from the print head nozzles through the tubes and into a waste ink container (not shown). Caps 47a and 47b also protect the nozzles of the print heads from dust, dirt and debris.

Figure 7:
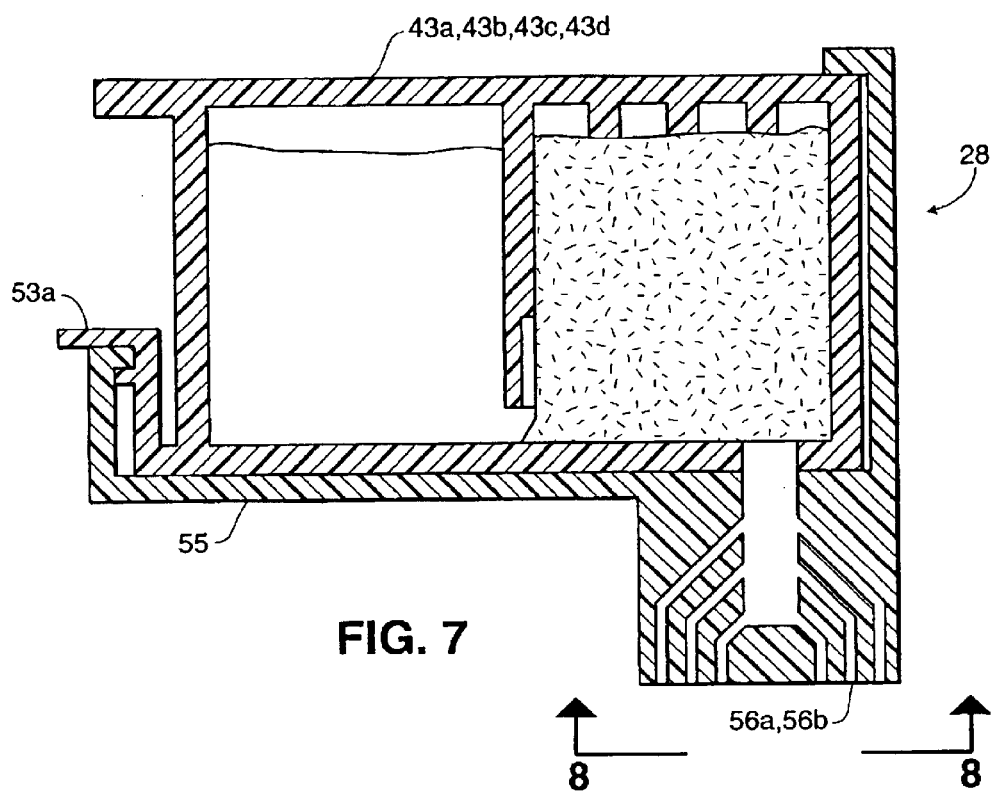
FIG. 7 is a cross-section view through a print cartridge and ink tank of the printer of FIG. 1.

FIG. 7 is a cross section view through one of the ink tanks installed in cartridge 28. Ink cartridge 28 includes cartridge housing 55, print heads 56a and 56b, and ink tanks 43a, 43b, 43c and 43d. Cartridge body 28 accommodates ink tanks 43a to 43d and includes ink flow paths for feeding ink from each of the ink tanks to either of print heads 56a or 56b. Ink tanks 43a to 43d are removable from cartridge 28 and store ink used by printer 10 to print images. Specifically, ink tanks 43a to 43d are inserted within cartridge 28 and can be removed by actuating retention tabs 53a to 53d, respectively. Ink tanks 43a to 43d can store color (e.g., cyan, magenta and yellow) ink and/or black ink. The structure of ink tanks 43a to 43b may be similar to that described in U.S. Pat. No. 5,509,140, or may be any other type of ink tank that can be installed in cartridge 28 to supply ink to print heads 56a and 56b.

Figure 8:
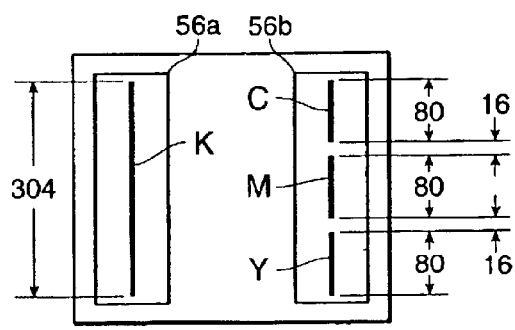
FIG. 8 is a plan view of a print head and nozzle configuration of the print cartridge of FIG. 7.

FIG. 8 depicts a nozzle configuration for each of print heads 56a and 56b. In FIG. 8, print head 56a is for printing black ink and print head 56b is for printing color ink. Print head 56a preferably includes 304 nozzles at a 600 dpi pitch spacing. Print head 56b preferably includes 80 nozzles at a 600 dpi pitch for printing cyan ink, 80 nozzles at a 600 dpi pitch for printing magenta ink, and 80 nozzles at a 600 dpi pitch for printing yellow ink. An empty space is provided between each set of nozzles in print head 56b corresponding to 16 nozzles spaced at a 600 dpi pitch. Each of print heads 56a and 56b eject ink based on commands received from a controller on circuit board 35.

Figure 9:
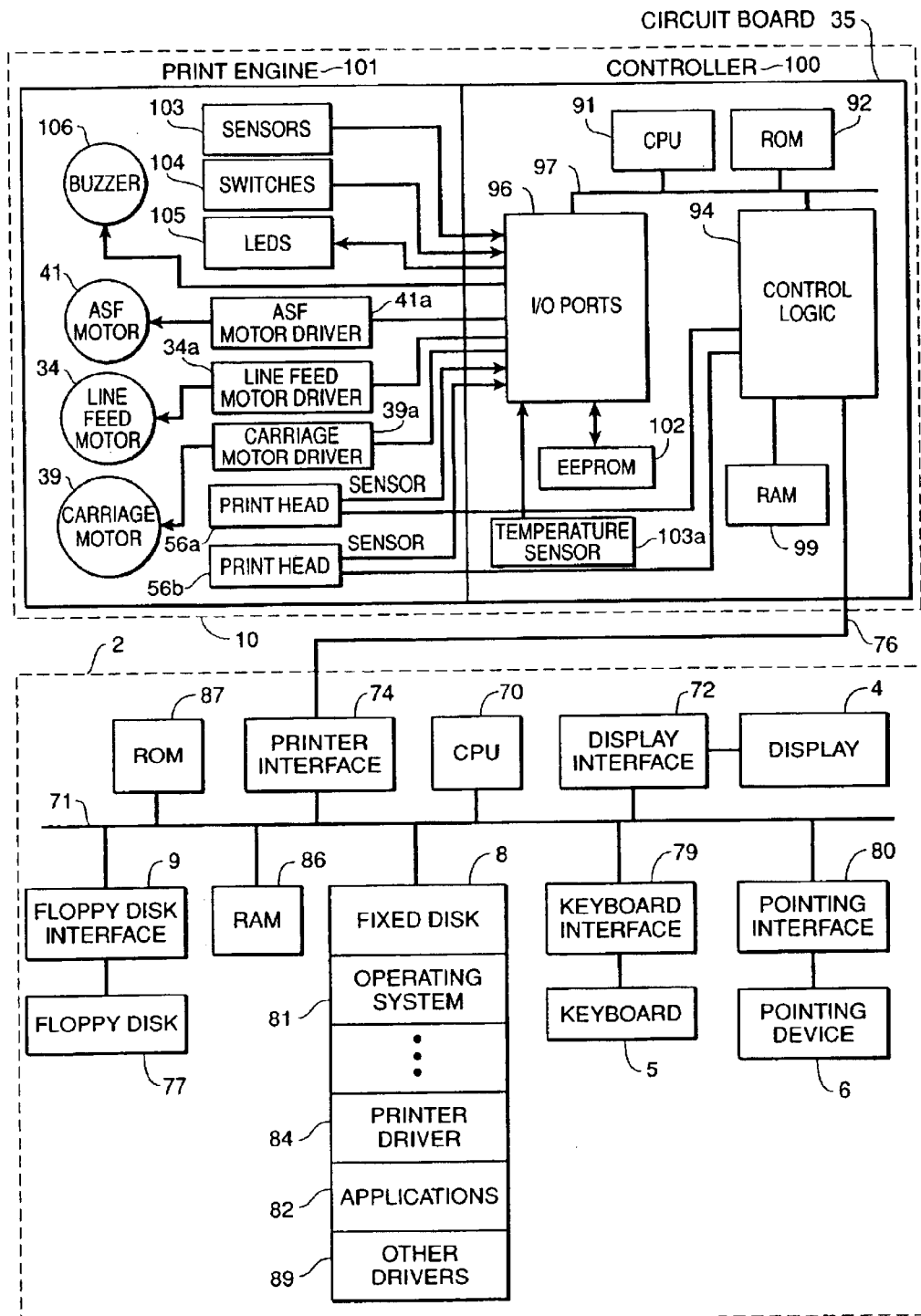
FIG. 9 is a block diagram showing the hardware configuration of a host processor interfaced to the printer of the present invention.

FIG. 9 is a block diagram showing the internal structures of host processor 2 and printer 10. In FIG. 9, host processor 2 includes a central processing unit 70 such as a programmable microprocessor interfaced to computer bus 71. Also coupled to computer bus 71 are display interface 72 for interfacing to display 4, printer interface 74 for interfacing to printer 10 through bi-directional communication line 76, floppy disk interface 9 for interfacing to floppy disk 77, keyboard interface 79 for interfacing to keyboard 5, and pointing device interface 80 for interfacing to pointing device 6. Disk 8 includes an operating system section for storing operating system 81, an applications section for storing applications 82, and a printer driver section for storing printer driver 84.

A random access main memory (hereinafter "RAM") 86 interfaces to computer bus 71 to provide CPU 70 with access to memory storage. In particular, when executing stored application program instruction sequences such as those associated with application programs stored in applications section 82 of disk 8, CPU 70 loads those application instruction sequences from disk 8 (or other storage media such as media accessed via a network or floppy disk interface 9) into random access memory (hereinafter "RAM") 86 and executes those stored program instruction sequences out of RAM 86. RAM 86 provides for a print data buffer used by printer driver 84. It should also be recognized that standard disk-swapping techniques available under the windowing operating system allow segments of memory, including the aforementioned print data buffer, to be swapped on and off of disk 8. Read only memory (hereinafter "ROM") 87 in host processor 2 stores invariant instruction sequences, such as start-up instruction sequences or basic input/output operating system (BIOS) sequences for operation of keyboard 5.

As shown in FIG. 9, and as previously mentioned, disk 8 stores program instruction sequences for a windowing operating system and fore various application programs such as graphics application programs, drawing application programs, desktop publishing application programs, and the like. In addition, disk 8 also stores color image files such as might be displayed by display 4 or printed by printer 10 under control of a designated application program. Disk 8 also stores a color monitor driver in other drivers section 89 which controls how multi-level RGB color primary values are provided to display interface 72. Printer driver 84 controls printer 10 for both black and color printing and supplies print data for print out according to the configuration of printer 10. Print data is transferred to printer 10, and control signals are exchanged between host processor 2 and printer 10, through printer interface 74 connected to line 76 under control of printer driver 84. Printer interface 74 and line 76 may be, for example an IEEE 1284 parallel port and cable or a universal serial bus port and cable. Other device drivers are also stored on disk 8, for providing appropriate signals to various devices, such as network devices, facsimile devices, and the like, connected to host processor 2.

Ordinarily, application programs and drivers stored on disk 8 first need to be installed by the user onto disk 8 from other computer-readable media on which those programs and drivers are initially stored. For example, it is customary for a user to purchase a floppy disk, or other computer-readable media such as CD-ROM, on which a copy of a printer driver is stored. The user would then install the printer driver onto disk 8 through well-known techniques by which the printer driver is copied onto disk 8. At the same time, it is also possible for the user, via a modem interface (not shown) or via a network (not shown), to download a printer driver, such as by downloading from a file server or from a computerized bulletin board.

Referring again to FIG. 9, printer 10 includes a circuit board 35 which essentially contain two sections, controller 100 and print engine 101. Controller 100 includes CPU 91 such as an 8-bit or a 16-bit microprocessor including programmable timer and interrupt controller, ROM 92, control logic 94, and I/O ports unit 96 connected to bus 97. Also connected to control logic 94 is RAM 99. Control logic 94 includes controllers for line feed motor 34, for print image buffer storage in RAM 99, for heat pulse generation, and for head data. Control logic 94 also provides control signals for nozzles in print heads 56*a* and 56*b* of print engine 101, carriage motor 39, ASF motor 41, line feed motor 34, and print data for print heads 56*a* and 56*b*. EEPROM 102 is connected to I/O ports unit 96 to provide non-volatile memory for printer information and also stores parameters that identify the printer, the driver, the print heads, the status of ink in the cartridges, etc., which are sent to printer driver 84 of host processor 2 to inform host processor 2 of the operational parameters of printer 10.

I/O ports unit 96 is coupled to print engine 101 in which a pair of print heads 56*a* and 56*b* perform recording on a recording medium by scanning across the recording medium while printing using print data from a print buffer in RAM 99. Control logic 94 is also coupled to printer interface 74 of host processor 2 via communication line 76 for exchange of control signals and to receive print data and print data addresses. ROM 92 stores font data, program instruction sequences used to control printer 10, and other invariant data for printer operation. RAM 99 stores print data in a print buffer defined by printer driver 84 for print heads 56*a* and 56*b* and other information for printer operation.

Sensors, generally indicated as 103, are arranged in print engine 101 to detect printer status and to measure temperature and other quantities that affect printing. A photo sensor (e.g., an automatic alignment sensor) measures print density and dot locations for automatic alignment. Sensors 103 are also arranged in print engine 101 to detect other conditions such as the open or closed status of access door 12, presence of recording media, etc. In addition, diode sensors, including a thermistor, are located in print heads 56*a* and 56*b* to measure print head temperature, which is transmitted to I/O ports unit 96.

I/O ports unit 96 also receives input from switches 104 such as power button 26 and resume button 24 and delivers control signals to LEDs 105 to light indicator light 23, to line feed motor 34, ASF motor 41 and carriage motor 39 through line feed motor driver 34*a*, ASF motor driver 41*a* and carriage motor driver 39*a*, respectively.

Although FIG. 9 shows individual components of printer 10 as separate and distinct from one another, it is preferable that some of the components be combined. For example, control logic 94 may be combined with I/O ports 96 in an ASIC to simplify interconnections for the functions of printer 10.

Figure 10:
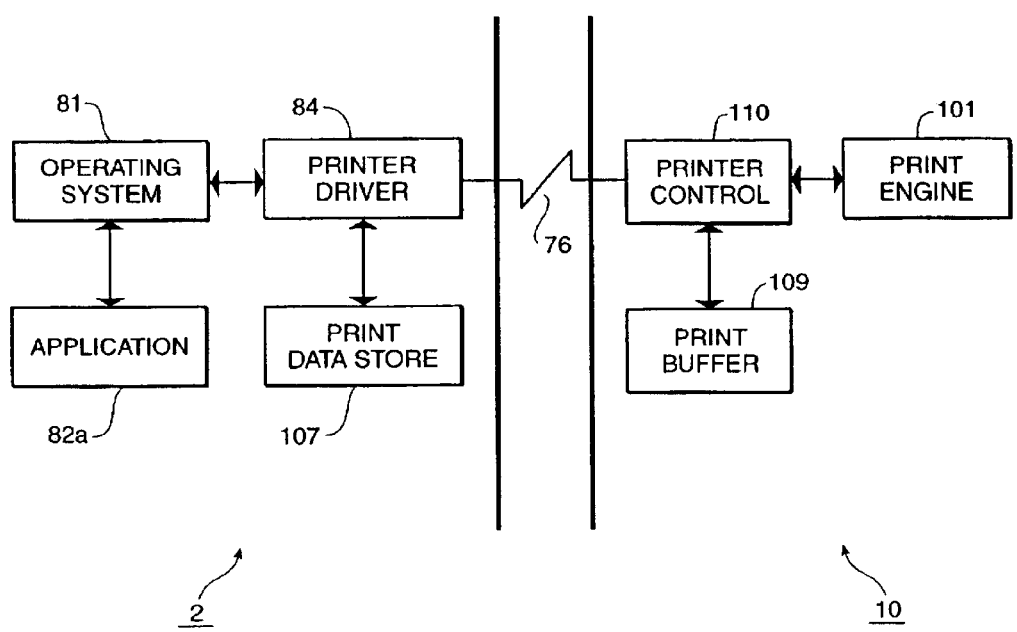
FIG. 10 shows a functional block diagram of the host processor and printer shown in FIG. 8.

FIG. 10 shows a high-level functional block diagram that illustrates the interaction between host processor 2 and printer 10. As illustrated in FIG. 10, when a print instruction is issued from image processing application program 82*a* stored in application section 82 of disk 8, operating system 81 issues graphics device interface calls to printer driver 84. Printer driver 84 responds by generating print data corresponding to the print instruction and stores the print data in print data store 107. Print data store 107 may reside in RAM 86 or in disk 8, or through disk swapping operations of operating system 81 may initially be stored in RAM 86 and swapped in and out of disk 8. Thereafter, printer driver 84 obtains print data from print data store 107 and transmits the print data through printer interface 74, to bi-directional communication line 76, and to print buffer 109 through printer control 110. Print buffer 109 resides in RAM 99, and printer control 110 resides in firmware implemented through control logic 94 and CPU 91 of FIG. 9. Printer control 110 processes the print data in print buffer 109 responsive to commands received from host processor 2 and performs printing tasks under control of instructions stored in ROM 92 (see FIG. 9) to provide appropriate print head and other control signals to print engine 101 for recording images onto recording media.

Print buffer 109 has a first section for storing print data to be printed by one of print heads 56*a* and 56*b*, and a second section for storing print data to be printed by the other one of print heads 56*a* and 56*b*. Each print buffer section has storage locations corresponding to the number of print positions of the associated print head. These storage locations are defined by printer driver 84 according to a resolution selected for printing. Each print buffer section also includes additional storage locations for transfer of print data during ramp-up of print heads 56*a* and 56*b* to printing speed. Print data is transferred from print data store 107 in host processor 2 to storage locations of print buffer 109 that are addressed by printer driver 84. As a result, print data for a next scan may be inserted into vacant storage locations in print buffer 109 both during ramp up and during printing of a current scan.

Figure 11:
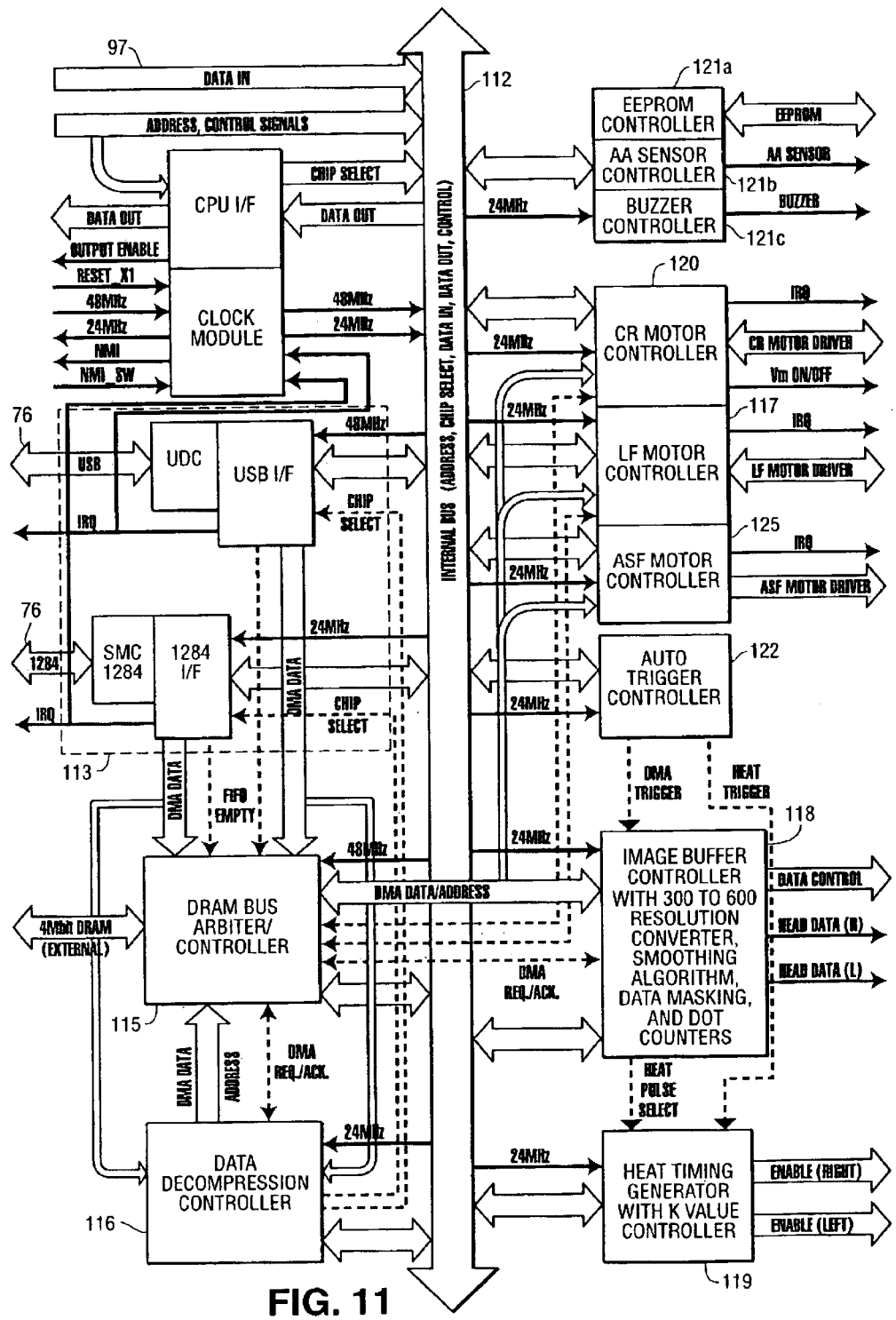
FIG. 11 is a block diagram showing the internal configuration of the gate array shown in FIG. 9.

FIG. 11 depicts a block diagram of a combined configuration for control logic 94 and I/O ports unit 96, which as mentioned above, I/O ports unit 96 may be included within control logic 94. In FIG. 11, internal bus 112 is connected to printer bus 97 for communication with printer CPU 91. Bus 112 is coupled to host computer interface 113 (shown in dashed lines) which is connected to bi-directional line 76 for carrying out bi-directional communication. As shown in FIG. 11, bi-directional line 76 may be either an IEEE-1284 line or a USB line. Bi-directional communication line 76 is also coupled to printer interface 74 of host processor 2. Host computer interface 113 includes both IEEE-1284 and USB interfaces, both of which are connected to bus 112 and to DRAM bus arbiter/controller 115 for controlling RAM 99 which includes print buffer 109 (see FIGS. 9 and 10). Data decompressor 116 is connected to bus 112, DRAM bus arbiter/controller 115 and each of the IEEE-1284 and USB interfaces of host computer interface 113 to decompress print data when processing. Also coupled to bus 112 are line feed motor controller 117 that is connected to line feed motor driver 34a of FIG. 9, image buffer controller 118 which provides serial control signals and head data signals for each of print heads 56a and 56b, heat timing generator 119 which provides block control signals and analog heat pulses for each of print heads 56a and 56b, carriage motor controller 120 that is connected to carriage motor driver 39a of FIG. 9, and ASF motor controller 125 that is connected to ASF motor driver 41a of FIG. 9. Additionally, EEPROM controller 121a, automatic alignment sensor controller 121b and buzzer controller 121c are connected to bus 112 for controlling EEPROM 102, an automatic alignment sensor (generally represented within sensors 103 of FIG. 9), and buzzer 106. Further, auto trigger controller 122 is connected to bus 112 and provides signals to image buffer controller 118 and heat timing generator 119, for controlling the firing of the nozzles of print heads 56a and 56b.

Control logic 94 operates to receive commands from host processor 2 for use in CPU 91, and to send printer status and other response signals to host processor 2 through host computer interface 113 and bi-directional communication line 76. Print data and print buffer memory addresses for print data received from host processor 2 are sent to print buffer 109 in RAM 99 via DRAM bus arbiter/controller 115, and the addressed print data from print buffer 109 is transferred through controller 115 to print engine 101 for printing by print heads 56a and 56b. In this regard, heat timing generator 119 generates analog heat pulses required for printing the print data.

Figure 12:
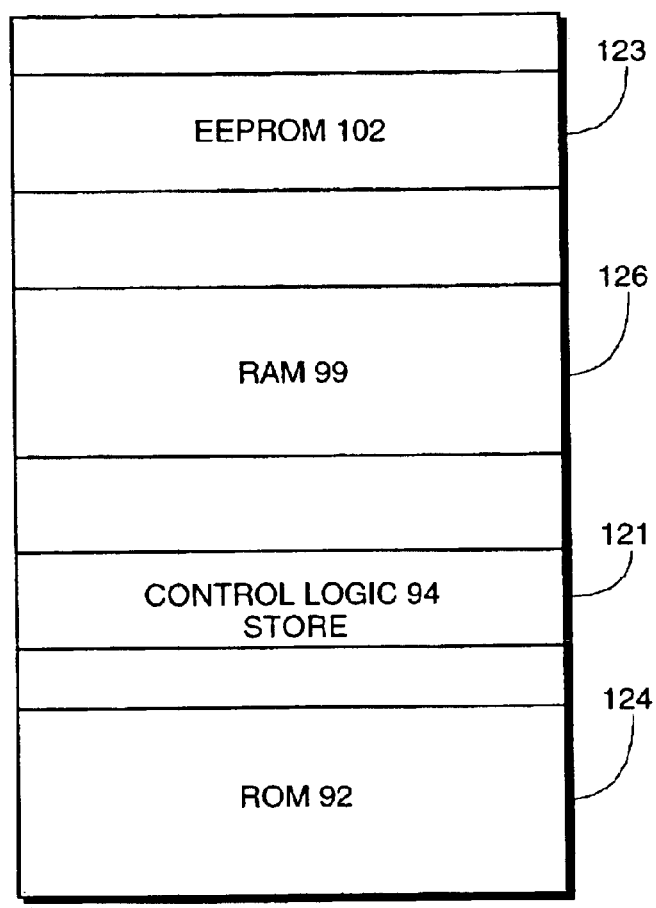
FIG. 12 shows the memory architecture of the printer of the present invention.

FIG. 12 shows the memory architecture for printer 10. As shown in FIG. 11, EEPROM 102, RAM 99, ROM 92 and temporary storage 121 for control logic 94 form a memory structure with a single addressing arrangement. Referring to FIG. 11, EEPROM 102, shown as non-volatile memory section 123, stores a set of parameters that are used by host processor 2 and that identify printer and print heads, print head status, print head alignment, and other print head characteristics. EEPROM 102 also stores another set of parameters, such as clean time, auto-alignment sensor data, etc., which are used by printer 10. ROM 92, shown as memory section 124, stores information for printer operation that is invariant, such as program sequences for printer tasks and print head operation temperature tables that are used to control the generation of nozzle heat pulses, etc. A random access memory section 121 stores temporary operational information for control logic 94, and memory section 126 corresponding to RAM 99 includes storage for variable operational data for printer tasks and print buffer 109.

A more detailed description of a line feed operation according to the invention will now be made with reference to FIGS. 13 to 16F. Briefly, the following discussion provides a description of increasing the line feed amount of the recording medium for each pulse of the line feed motor to achieve a faster line feed speed than conventional printers, and based on the line feed amount for each scan, controlling the number of print nozzles that are utilized for printing in each scan.

In increasing the line feed speed, the inventors herein have endeavored to depart from the one-to-one line feed ratio of conventional printers where one line feed motor pulse provides a corresponding one pixel (maximum resolution pixel) line feed of the recording medium. Instead, the inventors have endeavored to provide for a line feed amount greater than one pixel for each motor pulse. Recall that in conventional printers that print in a 1200 dpi print resolution, one motor pulse results in a one 1200 dpi pixel line feed of the recording medium. That is, one pulse of the line feed motor feeds the recording medium 1/1200 inch and 1200 motor pulses are required to feed the recording medium one inch. In contrast, the invention increases the line feed amount by increasing the pixel/pulse ratio to be greater than 1 . For example, in one representative embodiment described below, the print heads have 600 dpi resolution nozzles, and a pixel/pulse ratio of 1.5 in 600 dpi resolution (the resolution fo the print head) is utilized to increase the line feed amount, and a 1200 dpi resolution print is achieved by multi-pass scans (two scans) of the 600 dpi print heads. The pixel/pulse ratio of 1.5 in a 600 dpi resolution corresponds to a pixel/pulse ratio of 3 in a 1200 dpi resolution. That is, for each pulse of the line feed motor, a line feed amount of 3 pixels in 1200 dpi resolution is provided for. A ratio of 3 pixel/pulse in 1200 dpi resolution provides a line feed amount of 1/400 inch for each pulse of the line feed motor. Therefore, 400 motor pulses are required to feed the recording medium one inch. Thus, a pixel/pulse ratio of 3 is three times faster than a pixel/pulse ratio of 1 in a 1200 dpi printer.

This increase in line feed speed comes at minimal cost because existing motors can be utilized (i.e. a faster line feed motor is not required to achieve a faster line feed speed). However, as will be described below, the invention not only provides for a faster line feed speed, but also provides for printing in a high resolution. That is, although a faster line feed speed is obtained by increasing the pixel/pulse ratio, a high resolution (e.g. 1200 dpi) image can still be printed by controlling the number of nozzles that are utilized in each scan based on the line feed amount. A more detailed description of the increased pixel/pulse ratio will now be made, with a more detailed description of the nozzle control following thereafter.

As described above with regard to FIG. 5, line feed motor 34 drives line feed shaft 36 via line feed geartrain 40. Line feed shaft 36 includes line feed rollers 36a. When a sheet of a recording medium engages line feed rollers 36a, it is pinched between line feed rollers 36a and pinch rollers 36b. As the line feed motor rotates, it engages geartrain 40 to turn line feed rollers 36a, thereby feeding the sheet through the printer. As stated above, line feed motor 34 may be a stepper motor that rotates in pulsed increments. Each pulse of line feed motor 34 feeds the sheet of the recording medium through the printer. The amount of line feed of the recording medium for each pulse of the line feed motor depends on several factors, including the incremental pulse value of the line feed motor (i.e. the number of degrees of rotation for each pulse of the line feed motor), the geartrain ratio, and the line feed roller size.

As mentioned above, each of these factors have been set in prior art systems to provide a pixel/pulse ratio of 1. In the present invention, each of these factors (motor pulse amount, geartrain ratio and line feed roller size) are set so that one pulse of the line feed motor results in a line feed ratio greater than one. One example of a line feed motor, geartrain, and line feed roller design to achieve a 1.5 pixel/pulse line feed ratio in a pixel resolution of a print head will now be described with reference to FIGS. 13 to 15. It should be noted that a 1.5 pixel/pulse ratio in a pixel resolution of a print head is not the only ratio that may be used in practicing the invention and other line feed ratios may be also be utilized to achieve a faster line feed speed. For instance, the invention may be applied to a printer with line feed ratios of n.5 pixel/pulse, n.25 pixel/pulse, n.333 pixel/pulse, n.75 pixel/pulse, etc., where n is a whole number greater than one. However, for brevity, only a ratio of 1.5 will be discussed.

In one representative embodiment, the invention utilizes a line feed motor that is a 200 pulse, 2—2 phase stepper motor. A 200 pulse motor provides a 1.8° step amount for each pulse (360°×200 pulses=1.8°/pulse). Line feed motor 34 also preferably provides for a speed rating of up to at least 4800 pulse/sec (pps) (1440 RPM). As will be described below, a 1440 RPM speed rating, combined with the geartrain ratio and the line feed roller size provide for a line feed speed of up to 12 inches/sec. Of course, the invention is not limited to utilizing the foregoing motor specifications and any other motor could be utilized instead. The foregoing motor specifications are merely one example of a line feed motor that could be used in practicing the invention and variations in the motor could be implemented to achieve a faster line feed is speed. However, the foregoing line feed motor specifications have been included in the present example of a 1.5 pixel/pulse line feed amount in the resolution of the print head.

Figure 13:
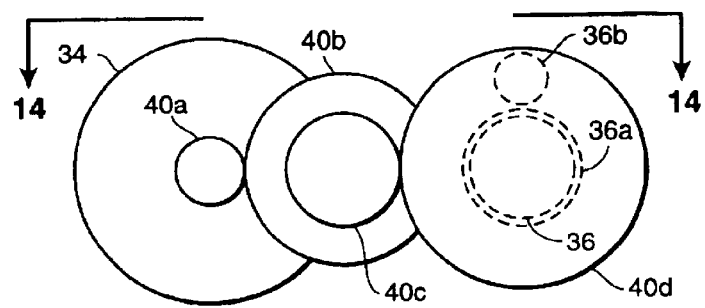
FIG. 13 is a side view of one possible line feed geartrain.
Figure 14:
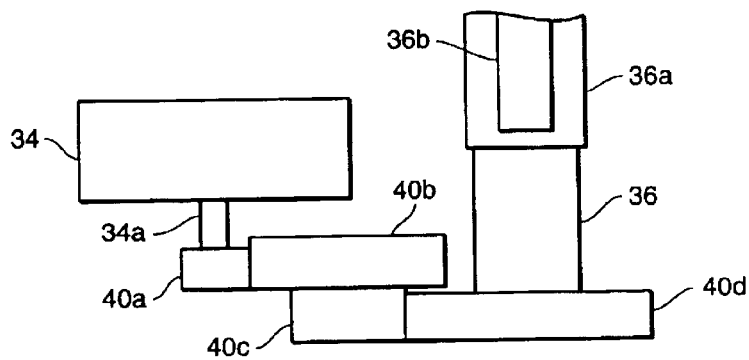
FIG. 14 is a top view of one possible line feed geartrain.

Line feed motor 34 engages and drives geartrain 40. One example of geartrain 40 is depicted in more detail in FIGS. 13 and 14. As seen in FIGS. 13 and 14, line feed motor 34 includes pinion 40a connected to drive shaft 34a of line feed motor 34. Pinion 40a engages and drives gear 40b. Gear 40b is connected to pinion 40c so that they rotate together when gear 40b is driven by pinion 40a. In this regard, gear 40b and pinion 40c may be molded together as one entity, or may be separate gears attached to a common shaft. Pinion 40c engages and drives gear 40d. Gear 40d is connected to and drives line feed drive shaft 36.

Drive shaft 36 includes line feed rollers 36a attached to drive shaft 36. Line feed rollers 36a are preferably made of a rubber material in order pick up the recording medium and feed it through the printer with minimum slippage. Additionally, line feed rollers 36a are approximately 16.17 mm in diameter. Of course, a different line feed roller size and material could also be implemented in the present invention. Line feed rollers 36a are engaged by pinch rollers 36b which are attached to the printer chassis and apply pressure against the recording medium when it is engaged and driven by line feed rollers 36a. In the present example of a 1.5 pixel/pulse line feed amount in theresolution the print head, the geartrain ratio has been designed to be approximately 1:8.3333.

Of course, the invention is not limited to the geartrain configuration and ratio shown in FIGS. 13 and 14 and any other geartrain design could be implemented to achieve the results of the present invention. However, the geartrain shown in FIGS. 13 and 14 has been implemented, in conjunction with the motor specifications described above, to achieve the line feed amount of 1.5 pixel/pulse of the present example.

Figure 15:
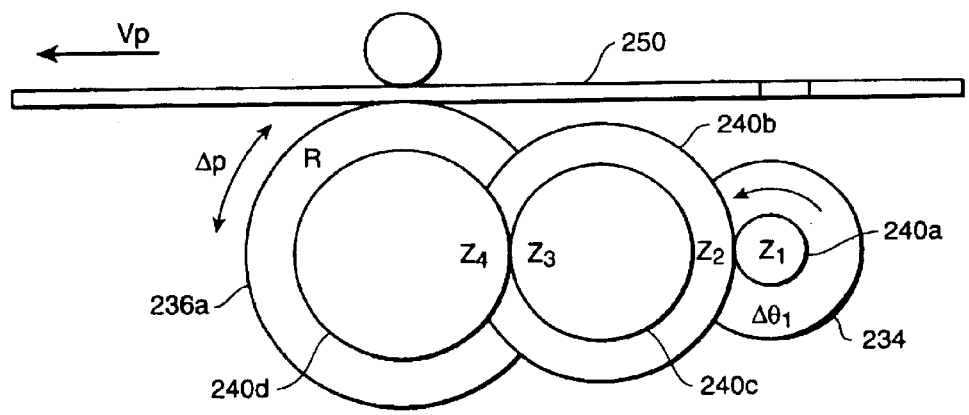
FIG. 15 is a diagram for calculating a line feed amount and paper velocity utilizing the geartrain of FIGS. 13 and 14.

FIG. 15 is a diagram depicting a geartrain similar to geartrain 40 for determining a paper velocity utilizing a motor specification, a geartrain ratio and a line feed roller size. In FIG. 15, motor 234 drives pinion 240a, which drives gear 240b and pinion 240c. Pinion 240c drives gear 240d that is connected to and drives line feed roller 236a.

In order to obtain a desired line feed amount (ΔP) for each pulse of the line feed motor (in this case a 1.5 pixel/pulse ratio or a 1/400 inch line feed amount), each of the foregoing elements are designed to provide the desired feed amount. The following formula can be utilized to obtain the desired feed amount.

$$\Delta P = R \times \frac{Z_1 \times Z_3}{Z_2 \times Z_4} \times \Delta \theta_1$$

In FIG. 15, $\theta_1$ generally represents one pulse (step amount) of the line feed motor, $Z_1$, $Z_2$, $Z_3$ and $Z_4$, generally represent gears 240a, 240b, 240c and 240d, R generally represents the diameter of line feed roller 236a, and ΔP represents the line feed amount. In the present example, a ΔP of 1/400 inch is the desired line feed amount. Therefore, utilizing the foregoing motor specification, geartrain ratio and line feed roller size, a 1/400 (or 1.5 pixel/pulse) line feed amount is achieved for a printer that prints in 1200 dpi resolution.

As stated above, the line feed motor preferably provides for at least a 4800 pps speed rating. Utilizing the line feed amount (ΔP=1/400 inch) and the motor pulse rate (4800 pps), the paper velocity can be determined from the equation, $\Delta V_p = \Delta P \times$ pulse rate. Therefore, a paper velocity of up to 12 inch/sec can be achieved.

Although a faster line feed speed (1/400) is achieved by the foregoing line feed drive assembly design, the invention further provides for control over the number of print head nozzles and the line feed motor pulses utilized in printing an image in order to achieve a printed image with the desired resolution. For a better understanding, consider FIGS. 16A to 16D.

Figure 16A:
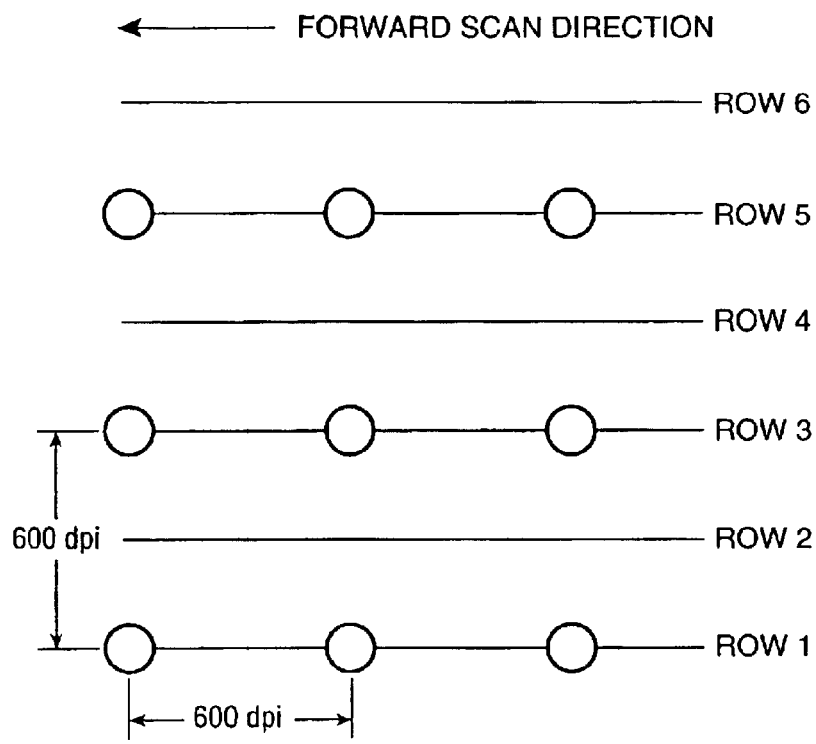
FIG. 16A depicts a sample pattern of ink droplets printed at a 600×600 dpi resolution.
Figure 16B:
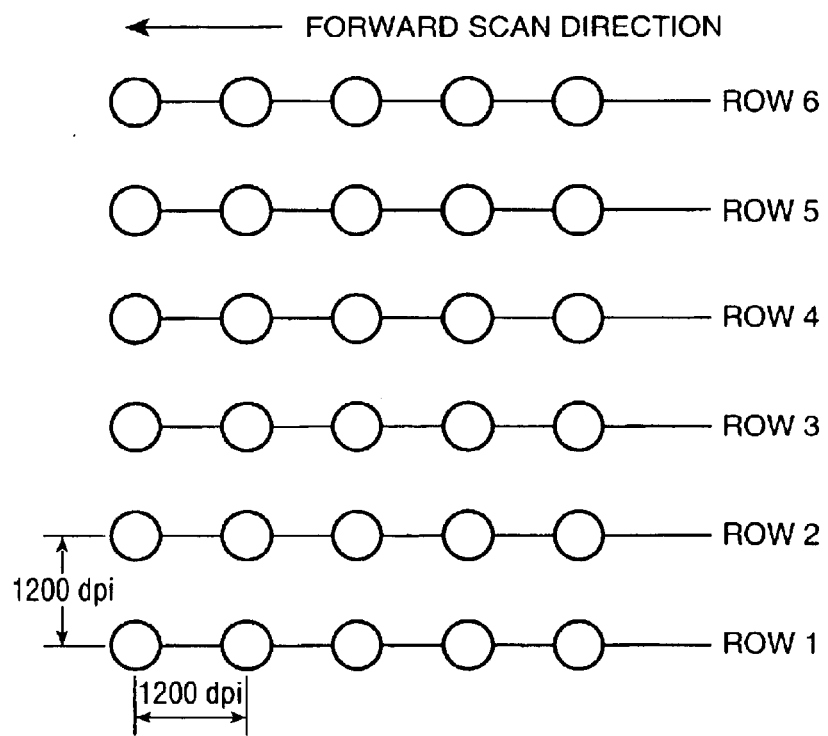
FIG. 16B depicts a sample pattern of ink droplets printed at a 600×600 dpi resolution.

FIG. 16A depicts a sample pattern of ink droplets printed at a 600 dpi×600 dpi resolution and FIG. 16B depicts a sample pattern of ink droplets printed at a 1200 dpi×1200 dpi resolution. In each of FIGS. 16A and 16B, the print head scans from right to left in a forward scan and from left to right in a reverse scan, and the line feed direction is from top to bottom (meaning that the paper is advanced in a top to bottom direction so that the print head nozzles move from Row 1 towards Row 2 when the paper is advanced.

Figure 16C:
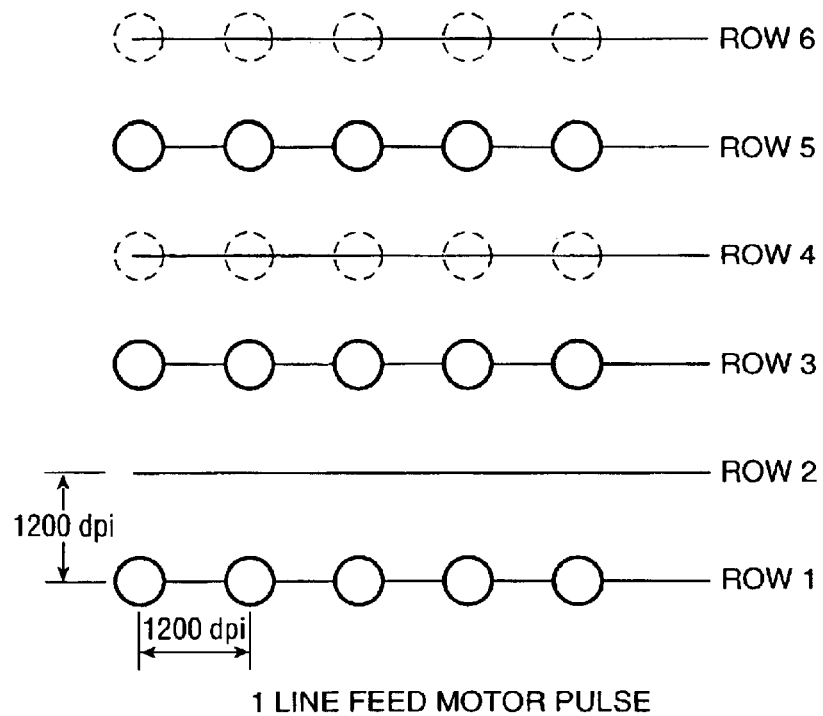
FIGS. 16C and 16D depict a print head nozzle location in a line feed direction for each pulse of a line feed motor.

A description will now be made with regard to FIGS. 16C and 16D of a 600 dpi×600 dpi print for a line feed ratio of 1.5 pixel/pulse, where one pixel is a 1200 dpi pixel (the maximum resolution of the printer is 1200 dpi). For each of FIGS. 16C and 16D, the print head nozzles are assumed to be spaced at a 600 dpi interval, similar to the print head described with regard to FIG. 8. In FIG. 16C, ink droplets (indicated by the solid dark dots) have been printed in one scan of the print head on rows 1, 3 and 5, each spaced 600 dpi apart along the line feeding direction. After the first scan of the print head, the recording medium is advanced for a second scan of the print head. As seen in FIG. 16C, one pulse of the line feed motor results in a 1.5 pixel line feed of the paper. That is, the paper is fed one and one-half 600 dpi pixels by one pulse of the line feed motor. If the print head were to perform a scan and print ink droplets after one pulse of the line feed motor, ink droplets would be printed at the locations shown by the white dots. Printing after one pulse would not provide a clear 600 dpi image since the ink droplets would be offset (in the line feeding direction) by one 1200 dpi pixel.

Figure 16D:
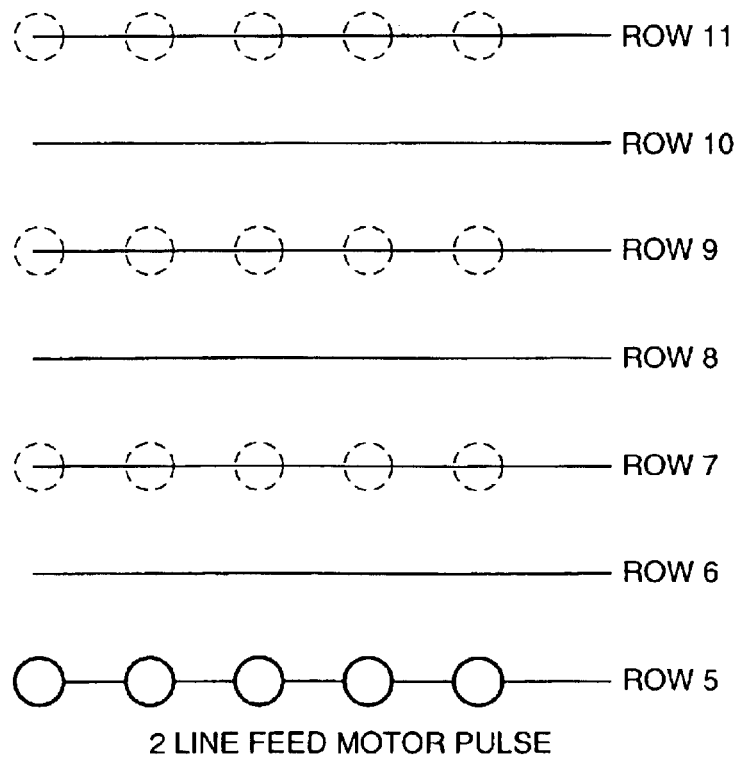

As shown in FIG. 16D, two line feed motor pulses are needed to advance the paper to perform a clear 600 dpi print. As such, for a 600 dpi print mode, increments of six 1200 dpi pixels are performed (corresponding to 2 motor pulses) in order to obtain a clear 600 dpi image.

To summarize the foregoing, in a printer that has a maximum print resolution of 1200 dpi and a line feed ratio of 1.5 pixel/pulse in the resolution of the print head (600 dpi), for printing in a 600 dpi mode, line feed increments of 6 (1200 dpi) pixels are utilized based on two motor pulses, and for printing in a 1200 dpi mode, line feed increments of 3 (1200 dpi) pixels are utilized based on one motor pulse. However, in order to utilize line feed increments of 3 or 6 pixels, the number of nozzles that are available for printing in any one scan are controlled to correspond to the line feed increments.

For example, in the prior art systems that have a one pixel/pulse line feed ratio, controlling the number of nozzles available for printing was generally not a factor. For instance, if a print head having 304 nozzles were implemented in the prior art systems to print a continuous image (i.e., an image with ink droplets printed by each nozzle in every scan), all 304 nozzles could be made available for printing in each scan. That is, a first scan could print with all 304 nozzles and, due to the one pixel/pulse line feed ratio, the paper could easily be advanced 304 pixels to line up the print head nozzles for printing the next scan, without regard to the line feed ratio. The paper can be advanced one pixel at a time to provide for printing the continuous image without any gaps because a whole number of motor pulses result in a whole number pixel advancement.

However, in the present invention, if the same continuous image were to be printed with the same 304 nozzle print head, but the line feed ratio were changed to 1.5 pixel/pulse in the resolution of the print head, a continuous image could not be printed using all 304 nozzles. That is, if all 304 nozzles were used for printing and the paper needed to be advanced 304 pixels for printing the next scan, the line feed ratio would result in either a gap in the continuous image, or an overlap in the image. For instance, as stated above, to maintain a continuous image at 600 dpi with a 1.5 pixel/pulse ratio in 600 dpi resolution, line feed increments of 3 pixels in 600 dpi are required. An advancement of 304 pixels divided by increments of 3 pixels in 600 dpi results in 202.667 motor pulses to achieve a continuous image. Since a fractional motor pulse can not be obtained in a stepper motor, the best advancement that could be obtained would be either 303 (600 dpi) pixels (202 motor pulses), which would result in an overlap of one 600 dpi pixel, or 300 (600 dpi) pixels (200 motor pulses), which would result in an overlap of four 600 dpi pixels. Therefore, not all of the 304 nozzles are available for printing and the print head nozzles are controlled to provide for a continuous image based, at least in part, on the line feed amount. In a 600 dpi print mode, an increment of the line feed motor is two motor pulses, corresponding to 3 pixels of 600 dpi. In a 1200 dpi print mode, an increment of the line feed motor is one motor pulse, corresponding to 3 pixels of 1200 dpi (1.5 pixels of 600 dpi).

The number of nozzles available for printing are controlled, in part, by the print driver. Although the print head contains 304 black nozzles and 80 color nozzles for each of cyan, magenta and yellow inks, the print driver is configured for a number of nozzles that are evenly divisible by the line feed ratio. In the example where the line feed ratio is set to 1.5 pixel/pulse in 600 dpi, the print driver is configured for 300 black nozzles and 78 color nozzles. 300 black nozzles allows for a 300 (600 dpi) pixel line feed advancement utilizing 200 motor pulses. Likewise, 78 color nozzles allows for a 78 (600 dpi) pixel line feed advancement utilizing 52 motor pulses. Therefore, for printing the continuous image, a first scan is performed to print with 300 nozzles, then the paper is fed 600 (1200 dpi) pixels (200 line feed motor pulses) to print the next scan similarly, for color, the first scan prints 78 nozzles and the paper is advanced 156 (1200 dpi) pixels (52 line feed motor pulses) to print the next scan. As a result, a continuous image can be printed without gaps or overlap in the printed pixels while at the same time, maintaining a faster line feed speed.

In controlling the number of nozzles, for the black print head having 304 nozzles, the print driver and printer are set-up to nominally print with nozzles 3 to 302, with nozzles 1, 2, 303 and 304 being (virtually) unavailable. That is, the print driver is nominally set-up to utilize the memory positions for nozzles 3 to 302. However, depending upon the print data and the line feed amount, the print driver may adjust the memory locations to shift up or down one or two nozzles. That is, the print driver may shift the data in the memory to utilize nozzles 1 to 300 (down two nozzles), 2 to 301 (down one nozzle), 4 to 303 (up one nozzle) or 5 to 304 (up two nozzles) depending on the image data to be printed and the line feed amount. Additionally, the printer ASIC may be utilized to mechanically shift the nozzles being utilized for printing.

Of course, as stated above, the invention is not limited to the 1.5 pixel/pulse line feed ratio in the resolution of the print head (600 dpi) in conjunction with 300 black and 78 color nozzles and other combinations could be provided for to obtain an increased line feed speed over the one pixel/pulse ratio. For instance, if a line feed ratio of 1.25 pixel/pulse in 600 dpi were utilized, 300 black and 80 color nozzles could also be utilized to obtain a continuous printed image (300 pixels÷1.25=240 motor pulses, 80 pixels÷1.25= 64 motor pulses). In this case, the maximum printable resolution is 2400 dpi. Similarly, if a line feed ratio of 1.333 pixel/pulse in 600 dpi were utilized, 300 black and 80 color nozzles could be utilized (300 pixels÷1.333~225 motor pulses, 80 pixels÷1.333~60 motor pulses). In this case, the maximum printable resolution is 1800 dpi.

Figure 17:
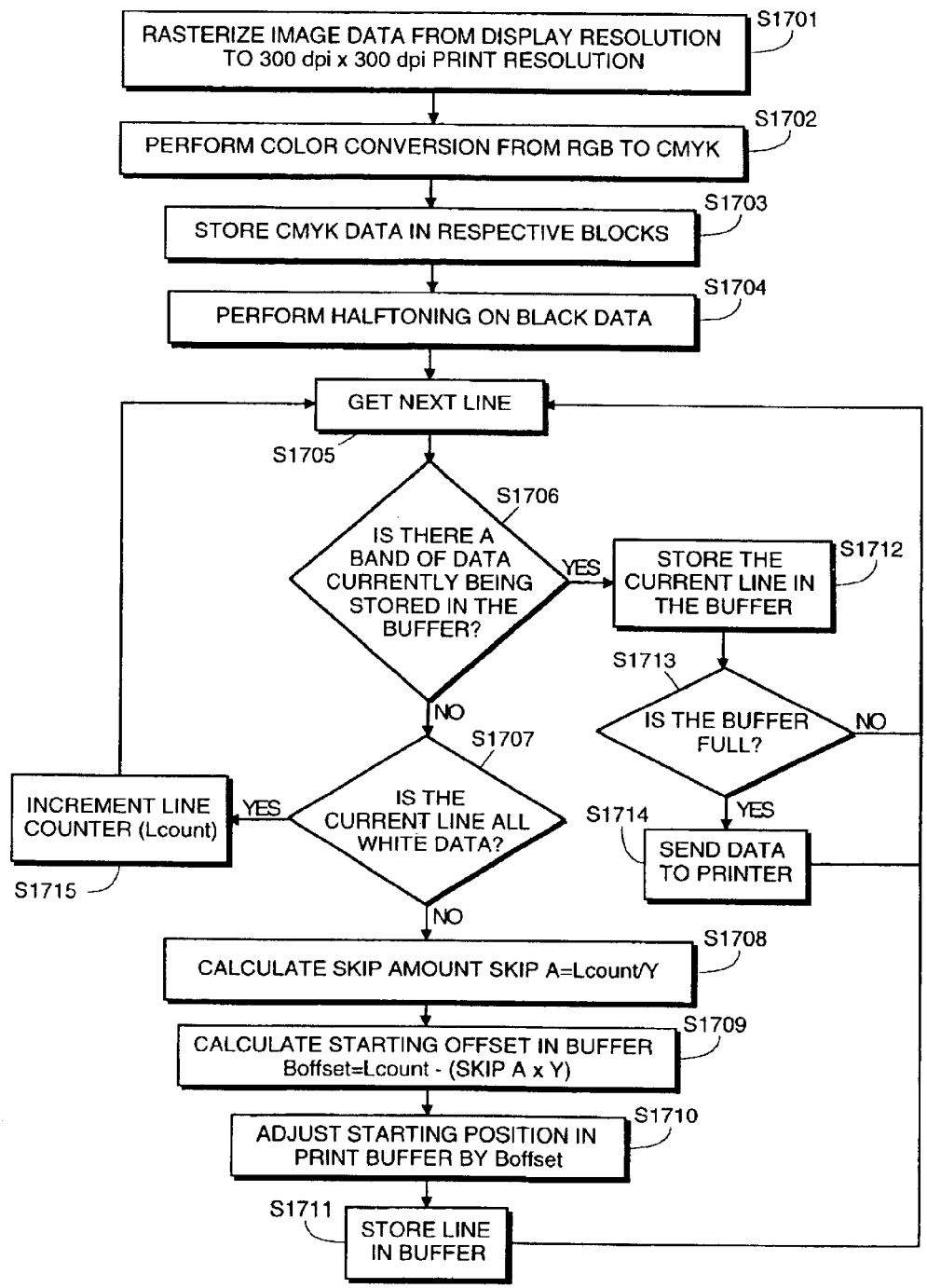
FIG. 17 is a flowchart depicting process steps of a first embodiment for controlling line feed and buffer loading for printing involving white space.

A description will now be made with regard to FIGS. 17 and 18 of control over line feed and buffer loading for printing black data where white spaces are encountered in the print buffer loading as the first line of data. FIG. 17 is a flowchart depicting process steps performed in a print driver for loading of a print buffer for black print data. Briefly, the process steps perform rasterization, color conversion and halftoning of the image data. Then the print buffer is loaded line-by-line with the loading process determining which line in the buffer to begin loading data based on whether a white space (no black print data) is present as the first line of data.

In step S1701, the print driver rasterizes the image data from a display resolution to a print resolution. For instance, the print driver may convert the image data from a typical 72 dpi display resolution to a 300 dpi×300 dpi print resolution. A 300 dpi×300 dpi rasterization resolution may be utilized where the printer prints in 300, 600, 1200, etc. dpi modes.

The rasterized image data is then subjected to a color conversion process in step S1702 to convert multivalue RGB (Red, Green and Blue) values for each pixel of the rasterized image into CMYK (cyan, magenta, yellow and black) values for printing. Then, the CMYK values for the image are stored in respective memory blocks for each of the color values (step S1703). It should be noted that the process steps of FIG. 17 generally apply to black data and not color data. Therefore, the present discussion of FIG. 17 is limited to a case for printing black data. After the data is stored in the memory blocks, the image data is subjected to a halftoning process in step S1704. After the halftoning process, the buffer loading process begins.

In the following discussion of the buffer loading, two scenarios will be discussed: a case where the first line being loaded in the buffer contains black data, and a case where the first (x) lines of data to be loaded in the buffer do not contain any black data, i.e. they represent white space. Additionally, the following discussion relates to a case where the buffer is being loaded for printing in the middle of a page. That is, some data has already been printed on the page and the paper is ready to be fed through the printer by the line feed motor for printing the next scan. The process steps will be described generally and then examples will be presented for further understanding.

In step S1705, the next line of data is obtained. Then, in step S1706, a determination is made whether any data is currently being stored in the print buffer. That is, a determination is made whether the print buffer currently contains at least one line of data. In a case where the print buffer has just released the print data to the printer and the data has been printed, this determination would be NO since the current line of data is the first line of data to be loaded into the empty print buffer. If however, there is at least one line of data in the print buffer, then flow proceeds to step S1712 where the current line, whether it contains black data or not, is stored in the next line of the print buffer. Then, a determination is made whether the buffer is full, and if so, the data is sent to the printer for printing. If the buffer is not full, then flow returns to step S1705 to get the next line of data. At this point, a loop is entered into between steps S1705, S1706, S1712 and S1713 until the print buffer is fully loaded, at which point flow exits the loop to step S1714 to send the data in the buffer to the printer for printing. Returning to step S1706, if a determination is made that no data is currently in the print buffer, then a determination is made whether the current line is all white data (step S1707). In a case where the current line is the first line being loaded into the print buffer and the current line contains black data, flow proceeds to steps S1708, S1709, S1710 and S1711. In this case, the black line is merely stored in the first line of the print buffer and flow returns to step S1705 whereby the foregoing loop (S1705, S1706, S1712, S1713) is entered into until the print buffer is full.

If however, a determination is made in step S1707 that the current line of data is all white, then a line counter value (Lcount) is incremented by one (step S1715) to account for the current white space line. Then, flow returns to step S1705 to get the next line. In the case where the first line of data is white space, then for the next pass through the process steps, flow would proceed from step S1705 to S1706 and back to S1707. If the second (current) line of data is also white (i.e. does not contain any black data), then a loop is entered into between steps S1705, S1706, S1707 and S1715 until a line of black data is encountered.

Once a line of black data is encountered in step S1707, then in step S1708 a skip amount (SkipA) is calculated. The skip amount determines how many lines the paper is to be fed to account for the white space. That is, step S1708 determines how many lines the line feed motor will advance the paper due to the white space. The SkipA value is determined by dividing the Lcount (the number of lines of white data that were counted in step S1715) by Y, where Y is the number of pixels corresponding to the amount of line feed for one pulse of the line feed motor. For instance in a case where the line feed ratio is 1.5 in 600 dpi, it corresponds to 3 pixels in 1200 dpi. That is, where the line feed ratio in the print head resolution is (m×1/n), the number of pixels in a print resolution printed by the printer corresponds to the line feed amount for one pulse of the line feed motor. The result of the calculation in step S1708 is rounded down to the nearest whole number. Therefore, step S1708 performs integer math that leaves a remainder. For example, in a case where 8 lines of white space are encountered and the line feed ratio is 1.5, Lcount would be 8 and the result of step S1708 would be 2 (8/3=2, with a remainder of 2). Therefore, the print driver would determine that the paper is to be advanced 2 pulses which corresponds to six 1200 dpi pixels.

After the skip amount is calculated in step S1708, a buffer offset amount (Boffset) is calculated in step S1709. The buffer offset value determines which line in the print buffer to begin loading the black print data to account for the remainder in step S1708. The value Boffset is calculated by the formula Boffset=Lcount−(SkipA×Y).

In the foregoing case where Lcount was 8, the line feed ratio was 1.5 in 600 dpi (3 pixels in 1200 dpi) and SkipA was calculated to be 2, the buffer offset would be 2 (8 −(2×3)=2), which corresponds to the remainder from step S1708. Then, in step S1710, the starting position in the print buffer for loading the black data of the current line is adjusted. In the present example, the starting position in the print buffer would be adjusted by two lines and the first two lines of the print buffer would be left blank with the black data of the current line being loaded in line three of the print buffer. The current line is then stored in the print buffer (step S1711) with flow returning to step S1705, whereby the S1705, S1706, S1712, S1713 loop is entered into until the print buffer is full.

For a better understanding of the process steps, consider the following examples. In the following examples, it is assumed that the line feed ratio has been set to 1.5 pixel/pulse in the resolution of the print head (600 dpi). Therefore, as described above, although print head 56a contains 304 nozzles, only 300 nozzles are utilized in any one scan to accommodate the line feed ratio of 1.5 pixel/pulse in 600 dpi. Accordingly, only 300 lines of the print buffer are utilized. Additionally, it is assumed that the print buffer has just been filled and the print data sent to the printer in step S1714. Therefore, at least one scan has been performed and the paper is ready to be fed by the line feed motor for printing the next line.

Two examples will be discussed. The first example discusses a case where the next line of data (the first line to be processed for filling the print buffer for the next scan) contains black data. The second example discusses a case where the next 31 lines of data do not contain any black data and therefore represent white space.

In the first example, in step S1705, the next line of data is obtained. In step S1706, a determination is made whether there is currently any data in the print buffer. Since the print buffer has just been emptied and the current pass through the process steps is for the first line of the print buffer, the result of the determination is NO and flow proceeds to step S1707.

In step S1707, a determination is made whether the current line is all white, i.e. whether it contains any black data. In the present example, the first line does contain black data and therefore the result of the determination is NO and flow proceeds to step S1708.

In step S1708, the Skip amount (SkipA) is calculated. Since the value of Lcount is zero (i.e., step S1715 has not been carried out to increment the Lcount value), the result of the calculation in step S1708 is zero. Similarly, the result of step S1709 (Boffset) is zero and no adjustment is made in the buffer loading in step S1710. Therefore, the current line is stored in the first line of the print buffer (step S1711) and flow returns to step S1705 to obtain the next line.

Since the first line of data has been stored in the print buffer, step S1706 results in a YES determination and the next line is stored in the print buffer in step S1712. The next line is stored in the print buffer regardless of whether it contains black data or not. Then, a determination is made whether the print buffer is full in step S1713. Since the print buffer holds 300 lines of data and the current pass only fills the second line, the result of the determination is NO and flow returns to step S1705 to obtain the next line.

At this point, a continuous loop is entered into between steps S1705, S1706, S1712 and S1713 until all 300 lines of the print buffer have been filled. When all 300 lines of the print buffer have been filled, then the result of step S1713 is YES and flow proceeds to step S1714 where the data in the print buffer is sent to the printer. After the data has been sent to the printer in step S1714, flow returns to step S1705 to obtain the next line.

At this point, a second example will be discussed in which the next 31 lines do not contain black data and therefore represent white space. As such, in step S1706 a determination is made whether there is any data in the print buffer. Since the print buffer has just been emptied, the result of the determination is No and flow proceeds to step S1707.

In step S1707, a determination is made whether the current line is all white data, i.e. whether it contains any black data. Since the first 31 lines are white space, the result of the determination is YES and flow proceeds to step S1715. In step S1715, a value Lcount is incremented by one from 0 to 1. Then flow proceeds to step S1705 to obtain the next line.

After obtaining the second line in step S1705, a determination is made in step S1706 whether there is any data in the print buffer. Since the first line was white data, nothing was stored in the print buffer and the result of the determination is NO. Therefore, flow proceeds to step S1707, whereby it is determined that the current line is again all white and the value Lcount is again incremented by one, this time from 1 to 2.

This loop between steps S1705, S1706, S1707 and S1715 continues for the first 31 lines since each of the first 31 lines are all white. As such, the value of Lcount is incremented to 31 before flow returns to step S1705 for the thirty-second line of data.

After the thirty-second line of data is obtained in step S1705, the result of the determination in step S1706 is still NO since none of the first 31 lines of data have been stored in the buffer. Therefore, flow proceeds to step S1707 where a NO determination is made since the current, line contains black data. As such, flow proceeds to step S1708.

In step S1708, the skip amount is calculated. The skip amount is determined by the formula SkipA=Lcount/Y. Recall that Lcount has been incremented for each of the first 31 lines to a value of 31 and the value for Y is 3(line feed ratio of 1.5 pixel in the print head resolution or m×1/n in the print head resolution, where m equal 3 and equals 2 and Y equals 3). Therefore, SkipA is calculated to be 10 units (31/3=10, with a remainder of 1). As a result, the paper would be fed 10 motor units, or 10 pulses which corresponds to 30 pixels.

In step S1709, the buffer offset (Boffset) is calculated to be 1 (Boffset=(31−(10×3)=1). Then, the starting position in the print buffer is offset by the value Boffset, here one line. Accordingly, the first line of the print buffer is left blank and the data begins loading to store the current line in the second line of the print buffer. Flow then returns to step S1705, whereby the S1705, S1706, S1712 and S1713 loop is entered into to process the next 299 lines of data.

Once all 299 lines of data have been filled, the data is released to the printer for printing.

Figure 18:
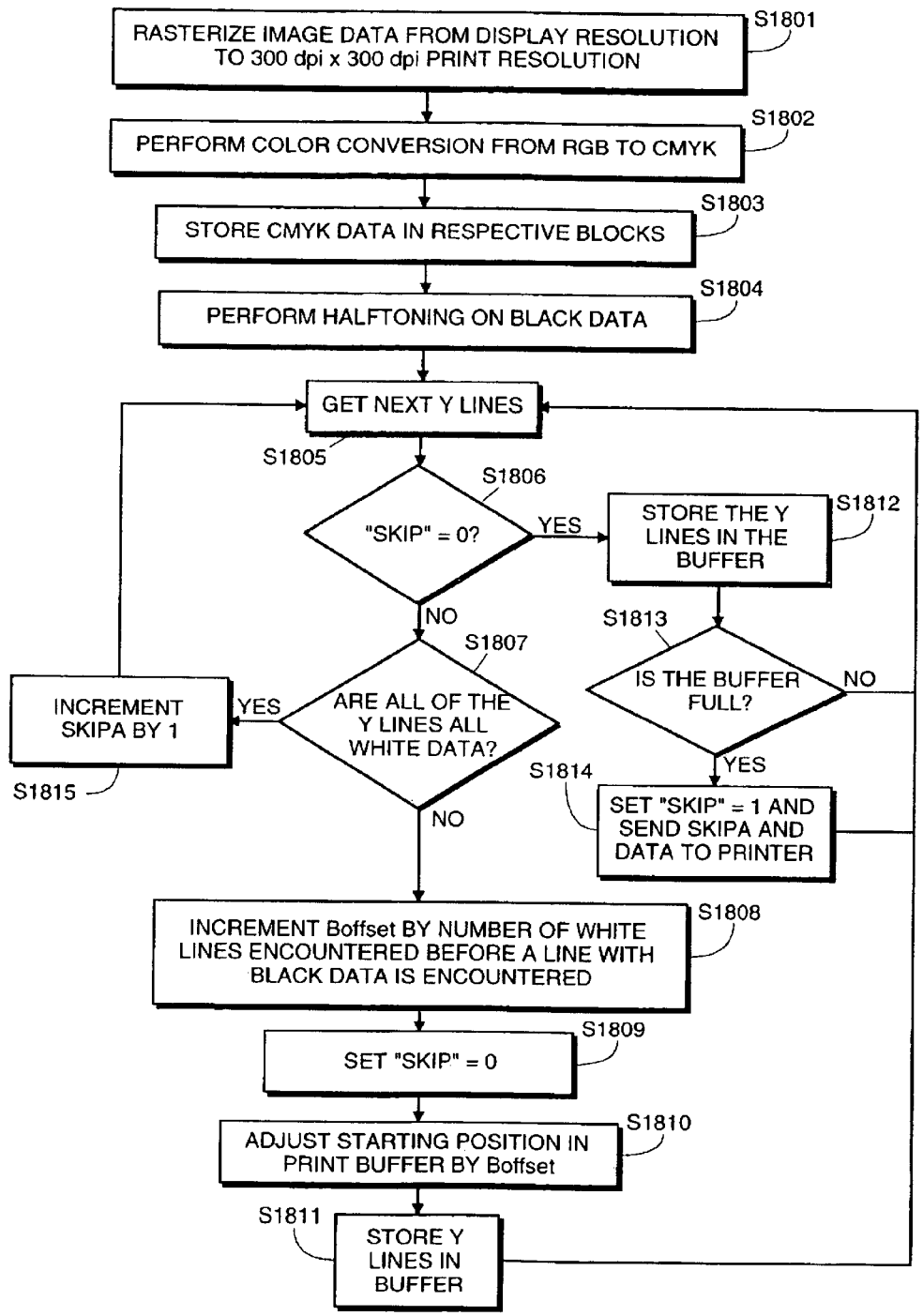
FIG. 18 is a flowchart depicting process steps of a second embodiment for controlling line feed and buffer loading for printing involving white space.

FIG. 18 is a flowchart depicting process steps for performing a process similar to that of FIG. 17. The process steps are preferably performed in a print driver for loading of a print buffer for black print data. Briefly, the process steps perform rasterization, color conversion and halftoning of the image data. Then the print buffer is loaded Y lines at a time, where Y corresponds to the number of pixels to be printed corresponding to the amount of line feed for one pulse of the line feed motor. For example, in the case described above where the line feed ratio is 1.5 pixel/pulse in a print head resolution of 600 dpi, Y would be 3. That is, one line feed motor pulse of the line feed motor would feed the recording medium three 1200 dpi pixels for printing in a 1200 dpi print mode, and two motor pulses of the line feed motor would feed the recording medium three 600 dpi pixels (or six 1200 dpi pixels) for printing in a 600 dpi print mode. Therefore, for each of these two cases, Y is equal to 3.

FIG. 18 will be described in a case where Y equals 3 for a 600 dpi print mode. Of course, the same steps would apply if the printer were printing in a 1200 dpi print mode since Y would also be 3. Three examples will be presented with regard to FIG. 18. In the each of the examples, similar to the discussion of FIG. 17, it will be assumed that the print buffer has just been emptied and that the next lines of data being processed are the first lines to be loaded into the print buffer. In a first example, the first line of data being processed contains black data. In a second example, the first two lines of data to be loaded into the print buffer are white data and the third line contains black data. Finally, in a third example, the first thirty-one lines of data to be loaded into the print buffer are white data and the thirty-second line contains black data.

In FIG. 18, steps S1801 to S1804 are the same as steps S1701 to S1704 described above. Therefore, the description of these steps will not be repeated here.

In the first example, in step S1605, the next Y lines (3 lines in the present example) of print data are obtained. Then, in step S1806, a determination is made whether a flag "skip" is set to 0. Nominally, when the print buffer is emptied in step S1814, the skip flag is set to 1. Therefore, in the present case, the print driver determines in step S1806 that the skip flag is set to 1 and flow proceeds to step S1807.

In step S1807, a determination is made whether all of the Y lines contain white data. This step determines whether or not the line feed motor is to feed the recording medium a number of lines corresponding to the line feed ratio to skip the white space. In the present example, the print driver determines whether all of the first 3 lines of data are white. Since the present example contains black data in the first line of data, the result of the determination in step S1807 is NO and flow proceeds to step S1808.

Step S1808 increments the buffer offset in order to adjust the loading of the print buffer to accommodate white data encountered as the first (x) lines of data. Therefore, step S1808 increments the buffer offset (Boffset) by the number of lines of white data encountered before a line that contains black data is encountered. In the present case where Y is 3, the most white lines of data that could be encountered before a line with black data would be encountered would be 2. In the present example where the first line of data contains black data, the value of Boffset is not incremented and flow proceeds to step S1809 where the skip flag is set to 0.

Then, in step S1810, the starting position for loading the print data into the print buffer is adjusted based on the value of Boffset. In the present example, Boffset is 0 and therefore the first line of print data is loaded into the first line of the print buffer. Accordingly, in step S1811, the first 3 lines of print data are loaded into the print buffer in lines 1 to 3 of the print buffer, respectively.

Flow then returns to step S1805 to obtain the next Y (3) line of data. Then, in step S1806, the print driver determines that the skip flag is 0 since the skip flag was set to 0 in step S1809. Accordingly, flow proceeds to step S1812 where the current 3 lines of data are stored in the print buffer. Then, step S1813 determines whether the print buffer is full. Since the print buffer contains 300 lines (corresponding to the 300 nozzles utilized for printing black data with print head 56a), the determination is NO and flow returns to step S1805.

The process continues in the S1805, S1806, S1812, S1813 loop until all 300 lines of the print buffer have been filled with print data. When the buffer is full, then flow proceeds from step S1813 to step S1814 where the skip flag is reset to 1, and SkipA and the print data are sent to the printer, thereby emptying the print buffer. In the present case, SkipA is 0 since flow did not pass through step S1815.

Next, a second example will be discussed in which, after the print buffer is emptied from the first example described above, the print data for the next Y (3) lines is obtained in step S1805. In the present (second) example, recall that the first two lines of data are white data and that the third line contains black data.

In step S1806, the print driver determines that the skip flag is 1 (it was reset to 1 in step S1814 when the print buffer was emptied for the first example). Then, in step S1807, the print driver determines that all of the Y (3) lines of data are not all white. That is, only the first two lines are all white, but the third line contains black data. Therefore, flow proceeds to step S1808.

In step S1808, the buffer offset (Boffset) is incremented by the number of lines of all white data that are encountered before a line with blacks data is encountered. In the present example, the first two lines of data are all white and therefore Boffset is incremented by two. Then, in step S1809 the skip flag is set to 0 and flow proceeds to step S1810.

In step S1810, the starting position for loading the print data in the print buffer is adjusted based on the value of Boffset. In the present example, the starting position is adjusted by two lines since Boffset is 2. Therefore, in step S1811, the first two lines in the print buffer are skipped and the first line that contains black data (the third line of the 3 Y lines in the present example) is loaded into line three of the print buffer. Flow then proceeds to step S1805 to obtain the next Y (3) lines of data.

In step S1806, the print driver determines that the skip flag is 0 and therefore, flow proceeds to step S1812. At this point, the loop S1805, S1806, S1812, S1813 is entered into until the print buffer has been filled. Once the print buffer has been filled, flow proceeds to step S1814 where the skip flag is reset to 1 and SkipA (again, 0 in the present example) and the print data are sent to the printer, thereby emptying the print buffer.

At this point, a third example will be discussed in which the first thirty-one lines of print data to be loaded into the print buffer all contain white data. In step S1805, the next Y (3) lines of print data are obtained, and in step S1806, the print driver determines that the skip flag is 1, whereby flow proceeds to step S1807.

In step S1807, the print driver determines that all of the Y (3) lines of data are white. Therefore, flow proceeds to step S1815 where the value SkipA is incremented by one. Each increment of SkipA corresponds to Y, such that each increment of SkipA results in a line feed of 3 pixels. For example, in the present case where the printer is printing at 600 dpi and SkipA is 1, the line feed motor performs two motor pulses to feed the recording medium three 600 dpi pixels, thereby skipping the 3 white space lines.

Flow then returns to step S1805 where the next Y (3) lines of data are obtained. In step S1806, the print driver determines that the skip flag is still set to 1 and therefore flow proceeds to step S1807. In the second pass through step S1807 of the current example, the print driver again determines that all 3 lines of data are white and therefore, flow again proceeds to step S1815 where, SkipA is incremented from 1 to 2. Flow continues in this S1805, S1806, S1807, S1815 loop for the first thirty lines (10 passes) since the first thirty-one lines are all white data. Accordingly, SkipA is incremented to 10 before the eleventh pass of through the process steps.

In the eleventh pass, step S1806 determines that the skip flag is still set to 0 and therefore flow proceeds to step S1807. In step 1807, the print driver determines that all of the Y (3) lines do not contain white data and therefore flow proceeds to step S1808. In step S1808, the buffer offset (Boffset) value is incremented by 1. Recall that the first thirty-one lines of data where all white and therefore, for the current pass through the process steps, one line of white data (the thirty-first line) is encountered before a line containing black data is encountered.

Flow then proceeds to steps S1809, S1810 and S1811 where the skip flag is set to 0, the starting position for loading of the print data in the print buffer is adjusted by one line, and lines 32 and 33 of the print data are stored in the print buffer in lines 2 and 3, respectively. Flow then returns to step S1805 where the S1805, S1806, S1812, S1813 loop is entered into until all 300 lines of the print buffer have been filled, whereby flow proceeds to step S1814. In step S1814, the skip flag is reset to 1 and the SkipA value (10) and the print data are sent to the printer. When the printer receives the SkipA value, the line feed motor advances the recording medium a number of pulses corresponding Y, in the present example, where the print is in 600 dpi resolution, 30 (600 dpi) lines or 20 motor pulses.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A printer that prints an image having a resolution higher than a resolution of nozzles on a print head on a recording medium by scanning the print head across a region of the recording medium a plural-number of times, said print head having nozzles spaced at a nozzle pitch which is a reciprocal number of the resolution of the nozzles and adapted to eject ink from the nozzles on the basis of print data, comprising:

a line feeding motor that is actuated in a unit of a pulse;

a line feeding device, driven by the line feeding motor actuated in the unit of the pulse, for feeding the recording medium in a unit of a predetermined feeding length fed by an actuating pulse, said predetermined feeding length being (m/k×nozzle pitch), where k is the resolution of the printed image/the resolution of the nozzles, m and k are integers, and m is greater than k but indivisible by k; and a controller for controlling the line feeding motor to actuate in the unit of the pulse and for controlling a number of the nozzles utilized for printing the image when printing an image on the recording medium by scanning the print head across the recording medium a plural-number of times.

2. A printer according to claim 1, wherein m equals 3 and k equals 2.

3. A printer according to claim 2, wherein the predetermined feeding length fed by the line feed motor by the actuating pulse corresponds to a length of 3 line feeds in the resolution of the printed image.

4. A printer according to claim 2, wherein said print head has 304 nozzles and the controller controls the usage of the 304 nozzles so that 300 or less nozzles are used for printing in any one scan of the print head.

5. A printer according to claim 2, wherein said print head has 80 nozzles and the controller controls the usage of the 80 nozzles so that 78 or less nozzles are used for printing in any one scan of the print head.

6. A printer according to claim 1, wherein the resolution of the nozzles is 600 dpi and the resolution of the printed image is 1200 dpi.

7. A printer according to claim 1, wherein when data of blank space lines is included in the print data, the controller controls the line feeding motor to skip the blank space lines by continuously outputting a number of the actuating pulses according to the feeding length of the space lines.

8. A printer according to claim 7, wherein the print head has a black printhead and a color printhead, and the controller controls the line feeding motor to skip the blank space lines when the blank space lines are included in the print data for the black printhead.

9. A printer according to claim 7, wherein the printer comprises a print buffer to store the print data, and the controller has a calculator for calculating an amount of offset to store print data in the print buffer based on the number of the blank space lines and the number of the actuating pulses for the skip.

10. A method of printing an image having a resolution higher than a resolution of nozzles on a print head on the recording medium by scanning the print head across a region of the recording medium a plural-number of times, said print head having nozzles spaced at a nozzle pitch which is a reciprocal number of the resolution of the nozzles, and adapted to eject ink from the nozzles on the basis of print data, comprising the steps of:

printing an image on the recording medium by scanning the print head across a region of the recording medium n times and ejecting ink from the nozzles, with controlling a number of the nozzles utilized for printing the image; and feeding the recording medium between one scan and a next scan for printing, in a unit of a predetermined feeding length fed by a line feeding device driven by a line feeding motor that is actuated in a unit of a pulse, said predetermined feeding length being fed by an actuating pulse being (m/k×nozzle pitch), where k is the resolution of the printed image/the resolution of the nozzles, m and k are integers, and m is greater than k but indivisible by k.

11. A method according to claim 10, wherein m equals 3 and k equals 2.

12. A method according to claim 11, wherein the predetermined feeding length fed by the line feed motor by the actuating pulse corresponds to a length of 3 line feeds in the resolution of the printed image.

13. A method according to claim 11, wherein said print head has 304 nozzles and the usage of the 304 nozzles is controlled so that 300 or less nozzles are used for printing in any one scan of the print head.

14. A method according to claim 11, wherein said print head has 80 nozzles and the the usage of the 80 nozzles is controlled so that 78 or less nozzles are used for printing in any one scan of the print head.

15. A method according to claim 10, wherein the resolution of the nozzles is 600 dpi and the resolution of the printed image is 1200 dpi.

\* \* \* \* \*

UNITED STATES PATENT AND TRADEMARK OFFICE
CERTIFICATE OF CORRECTION

PATENT NO. : 6,824,239 B1
DATED : November 30, 2004
INVENTOR(S) : Tadashi Hanabusa et al.

It is certified that error appears in the above-identified patent and that said Letters Patent is hereby corrected as shown below:

Column 3,
Line 28, "determining," should read -- determining --.

Column 7,
Line 8, "35 of course" should read -- 35. Of --.

Column 8,
Line 63, "fore" should read -- for --.

Column 9,
Line 29, "contain" should read -- contains --.

Column 12,
Line 15, "fo" should read -- for --.

Column 15,
Lines 63 and 65, "allows" should read -- allow --.

Column 16,
Line 3, "78" should read -- with 78 --;
Lines 34 and 35, "pixels+" should read -- pixels ÷ --.

Column 17,
Line 31, "Returning" should begin a new paragraph.

Column 19,
Line 23, "No" should read -- NO --.

Column 20,
Line 38, "S1605," should read -- S1805, --.

Column 21,
Line 36, "blacks" should read -- black --.

UNITED STATES PATENT AND TRADEMARK OFFICE
CERTIFICATE OF CORRECTION

PATENT NO. : 6,824,239 B1
DATED : November 30, 2004
INVENTOR(S) : Tadashi Hanabusa et al.

It is certified that error appears in the above-identified patent and that said Letters Patent is hereby corrected as shown below:

Column 22,
Line 11, "where," should read -- where --;
Line 15, "of through" should read -- through --; and
Line 37, "Y," should read -- to Y, --.

Signed and Sealed this

Twenty-first Day of March, 2006

JON W. DUDAS
*Director of the United States Patent and Trademark Office*